United States Patent [19]

Shimada

[11] Patent Number: 4,499,454

[45] Date of Patent: Feb. 12, 1985

[54] METHOD AND APPARATUS FOR ENCODING A DIGITAL SIGNAL WITH A LOW DC COMPONENT

[75] Inventor: Toshiyuki Shimada, Tokyo, Japan

[73] Assignee: Sony Corporation, Tokyo, Japan

[21] Appl. No.: 559,845

[22] Filed: Dec. 9, 1983

Related U.S. Application Data

[63] Continuation of Ser. No. 201,781, Oct. 29, 1980, abandoned.

[30] Foreign Application Priority Data

Nov. 21, 1979 [JP] Japan .................. 54-142252

[51] Int. Cl.$^3$ ............................................ H03K 13/00
[52] U.S. Cl. ................................ 340/347 DD; 360/40
[58] Field of Search ............... 340/347 DD; 235/310, 235/311; 375/19; 371/56; 360/39–44

[56] References Cited

U.S. PATENT DOCUMENTS

| | | | |
|---|---|---|---|
| 3,521,274 | 7/1970 | Sawai | 375/19 |
| 3,611,141 | 10/1971 | Waters | 375/19 |
| 3,631,471 | 12/1971 | Griffiths | 340/347 DD |
| 3,753,113 | 8/1973 | Maruta | 340/347 DD |
| 3,772,680 | 11/1973 | Kawai | 340/347 DD |
| 3,796,956 | 3/1974 | Fudemoto | 340/347 DD |

FOREIGN PATENT DOCUMENTS

| | | |
|---|---|---|
| 1203659 | 9/1970 | United Kingdom . |
| 1265213 | 3/1972 | United Kingdom . |
| 1293812 | 10/1972 | United Kingdom . |
| 1382975 | 2/1975 | United Kingdom . |
| 1423776 | 2/1976 | United Kingdom . |
| 1569076 | 6/1980 | United Kingdom . |

OTHER PUBLICATIONS

Furtney, "IBM Technical Disclosure Bulletin", vol. 18, No. 1, Jun. 1975, pp. 53–54.
Duc, "ATR", vol. 9, No. 1, 1975, pp. 3–14.

Primary Examiner—C. D. Miller
Attorney, Agent, or Firm—Lewis H. Eslinger; Alvin Sinderbrand

[57] ABSTRACT

A method and apparatus are provided for encoding an n-bit information word into an m-bit code word, $n \geq 2$ and $m > n$, wherein the DC component of successive code words is minimized. The digital sum variation (DSV) of a plurality of preceding m-bit code words is used to determine which of, for example, two m-bit code words should be generated to represent the n-bit information word to be encoded. The m-bit code word whose disparity, when combined with the digital sum variation, reduces the digital sum variation towards zero is selected.

51 Claims, 34 Drawing Figures

| INFO WORD | CODE+ | DSP+ | CODE- | DSP- |
|---|---|---|---|---|
| 0000 | 00000 | -5 (1011) | 11111 | 5 (0101) |
| 0001 | 00001 | -3 (1101) | 11110 | 3 (0011) |
| 0010 | 00010 | -3 (1101) | 11101 | 3 (0011) |
| 0011 | 00011 | -1 (1111) | 11100 | 1 (0001) |
| 0100 | 00100 | -3 (1101) | 11011 | 3 (0011) |
| 0101 | 00101 | -1 (1111) | 11010 | 1 (0001) |
| 0110 | 00110 | -1 (1111) | 11001 | 1 (0001) |
| 0111 | 00111 | 1 (0001) | 11000 | -1 (1111) |
| 1000 | 01000 | -3 (1101) | 10111 | 3 (0011) |
| 1001 | 01001 | -1 (1111) | 10110 | 1 (0001) |
| 1010 | 01010 | -1 (1111) | 10101 | 1 (0001) |
| 1011 | 01011 | 1 (0001) | 10100 | -1 (1111) |
| 1100 | 01100 | -1 (1111) | 10011 | 1 (0001) |
| 1101 | 01101 | 1 (0001) | 10010 | -1 (1111) |
| 1110 | 01110 | 1 (0001) | 10001 | -1 (1111) |
| 1111 | 01111 | 3 (0011) | 10000 | -3 (1101) |

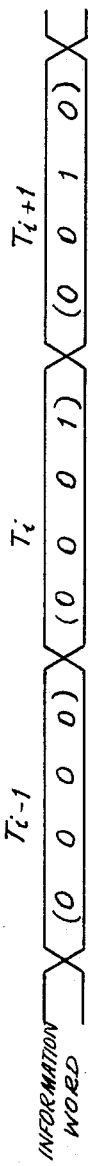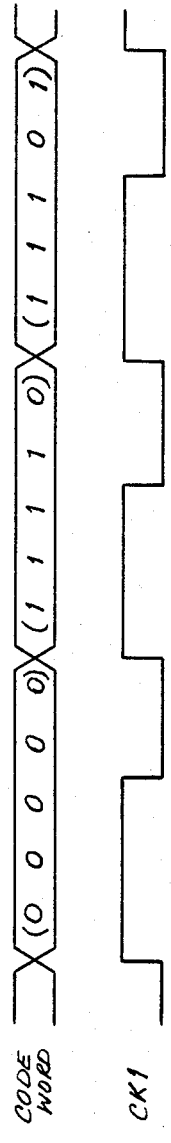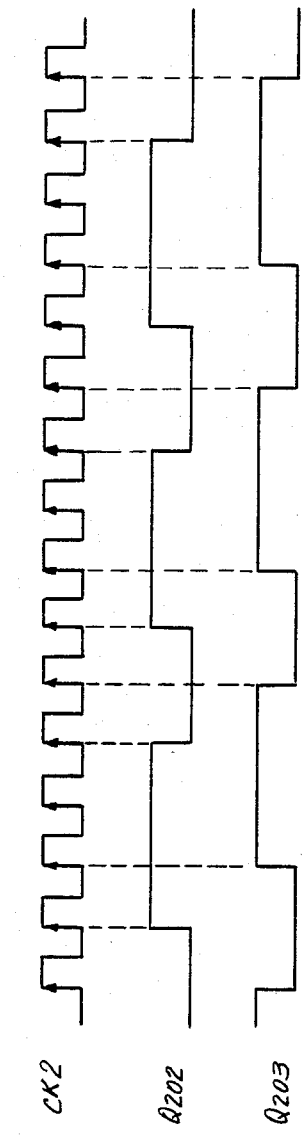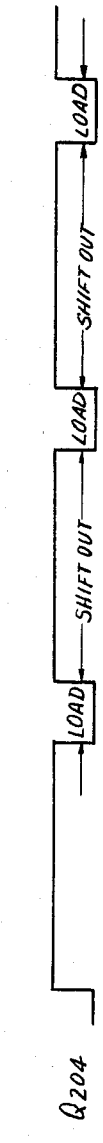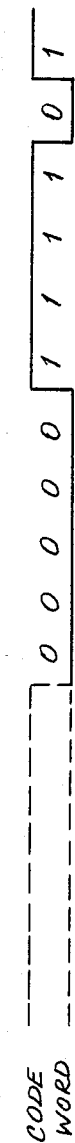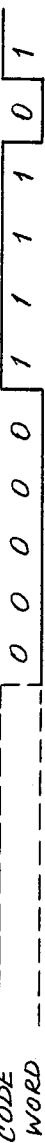

FIG. 10

| INFO WORD | CODE+ | DSP+ | CODE- | DSP- |
|---|---|---|---|---|
| 0 0 0 0 | 1 1 1 1 1 | 5 (0 1 0 1) | 0 0 0 0 0 | -5 (1 0 1 1) |
| 0 0 0 1 | 1 1 1 1 0 | 3 (0 0 1 1) | 0 0 0 0 1 | -3 (1 1 0 1) |
| 0 0 1 0 | 1 1 1 0 1 | 3 (0 0 1 1) | 0 0 0 1 0 | -3 (1 1 0 1) |
| 0 0 1 1 | 1 1 1 0 0 | 1 (0 0 0 1) | 0 0 0 1 1 | -1 (1 1 1 1) |
| 0 1 0 0 | 1 1 0 1 1 | 3 (0 0 1 1) | 0 0 1 0 0 | -3 (1 1 0 1) |
| 0 1 0 1 | 1 1 0 1 0 | 1 (0 0 0 1) | 0 0 1 0 1 | -1 (1 1 1 1) |
| 0 1 1 0 | 1 1 0 0 1 | 1 (0 0 0 1) | 0 0 1 1 0 | -1 (1 1 1 1) |
| 0 1 1 1 | 0 0 1 1 1 | 1 (0 0 0 1) | 1 1 0 0 0 | -1 (1 1 1 1) |
| 1 0 0 0 | 1 0 1 1 1 | 3 (0 0 1 1) | 0 1 0 0 0 | -3 (1 1 0 1) |
| 1 0 0 1 | 1 0 1 1 0 | 1 (0 0 0 1) | 0 1 0 0 1 | -1 (1 1 1 1) |
| 1 0 1 0 | 1 0 1 0 1 | 1 (0 0 0 1) | 0 1 0 1 0 | -1 (1 1 1 1) |
| 1 0 1 1 | 0 1 0 1 1 | 1 (0 0 0 1) | 1 0 1 0 0 | -1 (1 1 1 1) |
| 1 1 0 0 | 1 0 0 1 1 | 1 (0 0 0 1) | 0 1 1 0 0 | -1 (1 1 1 1) |
| 1 1 0 1 | 0 1 1 0 1 | 1 (0 0 0 1) | 1 0 0 1 0 | -1 (1 1 1 1) |
| 1 1 1 0 | 0 1 1 1 0 | 1 (0 0 0 1) | 1 0 0 0 1 | -1 (1 1 1 1) |
| 1 1 1 1 | 0 1 1 1 1 | 3 (0 0 1 1) | 1 0 0 0 0 | -3 (1 1 0 1) |

FIG.15

| INFORMATION WORD | CODE+ | DSP+ | CODE- | DSP- |
|---|---|---|---|---|
| 00000000 | 000000000 | -9 (10111) | 111111111 | 9 (01001) |
| 00000001 | 000000001 | -7 (11001) | 111111110 | 7 (00111) |
| 00000010 | 000000010 | -7 (11001) | 111111101 | 7 (00111) |
| 00000011 | 000000011 | -5 (11011) | 111111100 | 5 (00101) |
| 00000100 | 000000100 | -7 (11001) | 111111011 | 7 (00111) |
| 00000101 | 000000101 | -5 (11011) | 111111010 | 5 (00101) |
| 00000110 | 000000110 | -5 (11011) | 111111001 | 5 (00101) |
| 00000111 | 000000111 | -3 (11101) | 111111000 | 3 (00011) |
| 00001000 | 000001000 | -7 (11001) | 111110111 | 7 (00111) |
| 00001001 | 000001001 | -5 (11011) | 111110110 | 5 (00101) |
| 00001010 | 000001010 | -5 (11011) | 111110101 | 5 (00101) |
| 00001011 | 000001011 | -3 (11101) | 111110100 | 3 (00011) |
| 00001100 | 000001100 | -5 (11011) | 111110011 | 5 (00101) |
| ⋮ | ⋮ | ⋮ | ⋮ | ⋮ |
| 11111001 | 011111001 | 3 (00011) | 100000110 | -3 (11101) |
| 11111010 | 011111010 | 3 (00011) | 100000101 | -3 (11101) |
| 11111011 | 011111011 | 5 (00101) | 100000100 | -5 (11011) |
| 11111100 | 011111100 | 3 (00011) | 100000011 | -3 (11101) |
| 11111101 | 011111101 | 5 (00101) | 100000010 | -5 (11011) |
| 11111110 | 011111110 | 5 (00101) | 100000001 | -5 (11011) |
| 11111111 | 011111111 | 7 (00111) | 100000000 | -7 (11001) |

FIG.18

| INFORMATION WORD | CODE+ | DSP+ | CODE- | DSP- |
|---|---|---|---|---|
| 00000000 | 1000000000 | -8 (11000) | 0111111111 | 8 (01000) |
| 00000001 | 1000000001 | -6 (11010) | 0111111110 | 6 (00110) |
| 00000010 | 1000000010 | -6 (11010) | 0111111101 | 6 (00110) |
| 00000011 | 1000000011 | -4 (11100) | 0111111100 | 4 (00100) |
| 00000100 | 1000000100 | -6 (11010) | 0111111011 | 6 (00110) |
| 00000101 | 1000000101 | -4 (11100) | 0111111010 | 4 (00100) |
| 00000110 | 1000000110 | -4 (11100) | 0111111001 | 4 (00100) |
| 00000111 | 1000000111 | -2 (11110) | 0111111000 | 2 (00010) |
| 00001000 | 1000001000 | -6 (11010) | 0111110111 | 6 (00110) |
| 00001001 | 1000001001 | -4 (11100) | 0111110110 | 4 (00100) |
| 00001010 | 1000001010 | -4 (11100) | 0111110101 | 4 (00100) |
| 00001011 | 1000001011 | -2 (11110) | 0111110100 | 2 (00010) |
| 00001100 | 1000001100 | -4 (11100) | 0111110011 | 4 (00100) |
| 00001101 | 1000001101 | -2 (11110) | 0111110010 | 2 (00010) |
| 00001110 | 1000001110 | -2 (11110) | 0111110001 | 2 (00010) |
| 00001111 | 1000001111 | 0 (00000) | 0111110000 | 0 (00000) |
| ⋮ | ⋮ | ⋮ | ⋮ | ⋮ |
| 11111011 | 1011111011 | 6 (00110) | 0100000100 | -6 (11010) |
| 11111100 | 1011111100 | 4 (00100) | 0100000011 | -4 (11100) |
| 11111101 | 1011111101 | 6 (00110) | 0100000010 | -6 (11010) |
| 11111110 | 1011111110 | 6 (00110) | 0100000001 | -6 (11010) |
| 11111111 | 1011111111 | 8 (01000) | 0100000000 | -8 (11000) |

METHOD AND APPARATUS FOR ENCODING A DIGITAL SIGNAL WITH A LOW DC COMPONENT

This is a continuation of application Ser. No. 06/201,781, filed 10/29/80 now abandoned.

BACKGROUND OF THE INVENTION

This invention relates to a method and apparatus for encoding an information word and, more particularly, for encoding an n-bit information word into an m-bit code word wherein the DC component of successive code words is minimized, and wherein $n \geq 2$ and $m > n$.

Various techniques have been developed to transmit, or convey, a plural-bit digital signal, such as an n-bit digital signal, from one location, or medium, to another, wherein the digital signal which ultimately is received exhibits sufficient fidelity such that the original signal can be recovered. For example, digital signals are encoded in non-return-to-zero (NRZ) format, are encoded in various forms of error correcting codes, and are modulated in accordance with different modulation techniques in order to reduce errors and to ensure proper recovery of the original digital signals.

While many of the aforementioned techniques are successful, not all of them are available when, for example, a digital signal is to be magnetically recorded directly. One advantageous use of direct digital recording is in the field of video signal recording. Typically, video tape recorders (VTR's) are used to record video signals, such as a composite color video signal, in analog form. However, the advantages of digital techniques to obtain accurate, high fidelity reproductions, can be utilized in digital video recording systems. Accordingly, digital VTR's have been proposed, wherein a color video signal is sampled, and each sample is converted into an n-bit (e.g. 8-bit) digital signal. Successive 8-bit samples of the color video signal are recorded on magnetic tape by one or more rotary heads. An example of such a digital VTR is described in greater detail in copending application Ser. No. 192,358 now U.S. Pat. No. 4,329,708.

In such a digital VTR, the 8-bit digital signal is supplied to the rotary head via a recording amplifier and a rotary transformer. The transformer, and also the amplifier, cannot transmit, or pass, a DC signal. Consequently, the DC component of the digital signal, that is, the DC levels which represent the binary "1" and "0" logic conditions, are cut off. This means that the digital signal is recorded without its original DC component. As a consequence thereof, the recorded version of the original digital signal may be substantially distorted, thereby hindering accurate reproduction of the original digital signal. Still further, during reproduction of the digital signal from the magnetic tape, if any remanant DC component is present, the reproducing circuit components tend to inhibit any reproduction of even that remanant component. Also, if the number of transitions in the recorded digital signal is low, for example, if the run-length of the "0"s and "1"s is high, the level of the reproduced digital signal is reduced. Consequently, to minimize distortion in the recording and subsequent reproduction of a digital signal, it is desirable to minimize the DC component of the original signals.

If a binary "1" is represented by, for example, a DC level of +1 volt, and if a binary "0" is represented by a DC level of −1 volt, then a binary "1" followed by a binary "0" [10] will exhibit a zero DC component. A combination of bits, such as [100] exhibits a DC component of −1. A combination of bits [1001] exhibits a DC component of 0. Thus, a plural-bit word may be thought of as having a DC component that is equal to the difference between the number of binary "1"s and "0"s contained in that plural-bit word. This DC component is referred to in the specification and claims as the "disparity" of that plural-bit word. If the disparity of a digital word is positive, then the number of binary "1"s exceeds the number of binary "0"s in that word. Conversely, if the disparity of a digital word is negative, then the number of binary "1"s is less than the number of binary "0"s. A digital word formed of an odd number of bits will exhibit a non-zero disparity, the absolute magnitude of which represents the number of bits of one state which exceed the number of bits of the other state, and the polarity (i.e. plus or minus) represents whether the binary "1"s exceed the "0"s (positive disparity) or the binary "0"s exceed the "1"s (negative disparity). A plural-bit word formed of an even number of bits may exhibit either positive disparity, negative disparity or zero disparity, the latter being present when the number of binary "1"s equals the number of binary "0"s.

One technique for maintaining a low DC component in the original digital signal, which would reduce the distortion in the reproduced digital signal, is to utilize a so-called low disparity code. In low disparity encoding, an original digital signal is converted to a digital signal having a greater number of bits, the total number of bits in that converted digital signal being an even number. For example, if the original digital signal is a 4-bit word, then one type of low disparity encoding technique is to convert that 4-bit information word into a 6-bit code word, each 6-bit code word having zero disparity, that is, each 6-bit code word is comprised of three binary "1"s and three binary "0"s. Since the number of "1"s is equal to the number of "0"s, the code word exhibits zero disparity. This low disparity encoding technique is known as the (4, 6; 0) coding technique, which means that an original 4-bit information word is encoded into a 6-bit code word having zero disparity. It is appreciated that a 4-bit code is capable of representing sixteen different words. In a 6-bit word, there are twenty individual words which contain an equal number (i.e. three) of "0"s and "1"s. Furthermore, each 6-bit code word representation of a 4-bit information word may exhibit an acceptable run-length. That is, the number of consecutive "1"s or "0"s in the 6-bit code word need not be too great.

However, if the (4, 6; 0) low disparity code technique is used to encode an 8-bit video sample for digital recording, it is necessary to represent each 8-bit video sample, or information word, as a 12-bit code word. Of these twelve bits, four bits do not represent useful information and, therefore, are redundant. In the simplified 6-bit code word, two bits are redundant. That is, these additional bits are provided merely to result in low disparity so as to reduce the DC component of the digital signal to be recorded. Such redundant bits, when recorded, result in a higher density on the recording medium. That is, in a specified recording area which previously contained four (or eight) information bits, there are provided six (or twelve) bits. Still further, when six bits are recorded in an area which previously contained four bits, the width of each of those six bits is reduced relative to the width of each of the original four bits. This reduces the so-called "detecting window" during which a reproduced bit can be sensed.

Hence, there is a greater possibility of introducing error into the reproduced low disparity code word. Yet another disadvantage of this type of low disparity coding technique is that, if a read only memory (ROM) is used to encode an 8-bit information word into a 12-bit code word, the memory capacity of the ROM must be high. It is thus difficult to construct a satisfactory low disparity encoder as a large scale integrated (LSI) circuit.

OBJECTS OF THE INVENTION

Therefore, it is an object of the present invention to provide an improved method and apparatus for encoding successive information words into code words having minimal DC component.

Another object of this invention is to provide an improved method and apparatus for encoding an n-bit information word into an m-bit code word which avoids the aforenoted disadvantages.

A further object of this invention is to provide a method and apparatus for (n, m) encoding in which the encoded m-bit word is provided with a minimum of redundant bits yet exhibits a low overall DC component.

An additional object of this invention is to provide a (n, m) encoding technique wherein the encoded m-bit word is capable of being transmitted accurately through a system which blocks DC signals, such as a magnetic recording system.

Yet another object of this invention is to provide an improved method and apparatus of (n, m) encoding which is particularly useful in a digital VTR.

A still further object of this invention is to provide a method and apparatus of (n, m) encoding wherein the encoded m-bit code word is capable of self-clocking.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus of encoding successive n-bit information words into successive m-bit code words having minimum DC component, wherein $n \geq 2$ and $m > n$, are provided. A m-bit code word representing an n-bit information word to be encoded is generated as a function of the digital sum variation of a plurality of preceding m-bit code words. The m-bit code word whose disparity tends to reduce the digital sum variation towards zero is selected.

In one embodiment, each n-bit information word can be represented by an m-bit code word having positive disparity and a m-bit code word having negative disparity. If the digital sum variation is positive, the negative-disparity m-bit code word is selected and, conversely, if the digital sum variation is negative, the positive-disparity m-bit code word is selected.

BRIEF DESCRIPTION OF THE DRAWINGS

The following detailed description, given by way of example, will best be understood in conjunction with the accompanying drawings in which:

FIGS. 5A-5H are waveform diagrams which are useful in understanding the operation of the embodiment shown in FIG. 4;

FIG. 10 illustrates another table representing possible 5-bit code words, and their disparities, which can be used to represent 4-bit information words;

FIG. 15 is a table which represents the code words that may be produced by the embodiment shown in FIG. 14 to represent 8-bit information words;

FIG. 18 is a table representing the code words which can be produced by the embodiment shown in FIG. 17 to represent 8-bit information words;

DETAILED DESCRIPTION OF PREFERRED EMBODIMENTS

Figures 1, 2:
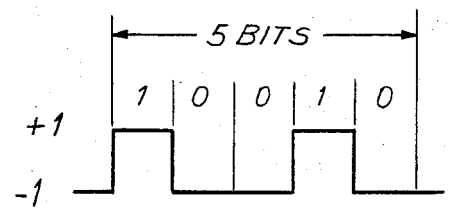
FIG. 1 is a waveform diagram of a 5-bit digital signal which is useful in understanding the present invention.
FIG. 2 is a table representing possible 5-bit code words, and their respective disparities, which can be used to represent 4-bit information words.

Before describing different embodiments of the present invention, a definition of the terms used in the specification and claims is provided. As used herein, the following terms are intended to have the indicated meaning:

Information word refers to an n-bit digital signal, wherein $n \geq 2$. In the examples described below, $n=4$ and $n=8$. Typically, a color video signal is sampled and converted into an 8-bit digital representation. This 8-bit digital representation of the sampled video signal is an 8-bit information word.

Code word refers to the m-bit digital word that represents the original n-bit information word, where $m > n$. In the examples described below, $m=5$, $m=9$ and $m=10$. In a digital VTR, this m-bit code word is recorded.

Disparity (DSP) has been described above. The disparity of a digital word, such as an n-bit information word or an m-bit code word, represents the DC component of that word. If a binary "1" bit is represented as a positive DC level, such as $+1$ volt, and if a binary "0" bit is represented as a negative DC level, such as $-1$ volt, then the disparity of the digital word is equal to a positive magnitude if the number of "1"s exceeds the number of "0"s in that word, is equal to a negative magnitude if the number of "0"s exceeds the number of "1"s, and is equal to zero if the number of "1"s equals the number of "0"s. The absolute magnitude of the disparity is equal to the difference between the "1"s and "0"s. The disparity of a digital word comprised of an even number of bits may be equal to zero. The disparity of a digital word comprised of an odd number of bits is either positive or negative. A positive disparity represents that the DC component of the digital word is positive, and a negative disparity represents that the DC component of the digital word is negative. For the purpose of the present discussion, disparity (DSP) is defined as:

$$DSP = n_1 - n_0$$

wherein $n_1$ is the number of "1"s in the digital word and $n_0$ is the number of "0"s in the same word. For an m-bit code word, $n_1 + n_0 = m$. Hence, $DSP = 2n_1 - m$.

Digital Sum Variation (DSV) refers to the DC value that would be obtained by integrating the successive binary "1"s and "0"s of successive digital signals, such as successive m-bit code words, assuming that positive and negative DC levels, such as +1 volt and −1 volt, represent the "1" and "0", respectively. Digital sum variation (DSV) for successive digital words may be determined by summing the disparities of such words. If successive digital words are transmitted serially-by-bit, then the DSV changes at each succesive bit. For example, the DSV of the serially transmitted word [10010] will change, successively, from an initial value (assumed to be zero) to +1, then to 0, then to −1, then to 0 and then −1 at the conclusion of this word. It is appreciated that the disparity of this same word [10010] is equal to −1. Thus, the DSV which is obtained from a plurality of m-bit code words represents the DC component of those words. It will be appreciated that, in accordance with the present invention, successive m-bit code words are selected such that the overall DSV is minimized.

In the absence of the present invention, if successive information or code words are transmitted without particular restraints as to the selection thereof, it is possible that the DSV for successive ones of such digital words may increase in the positive or negative direction without limitation. However, and as will be appreciated, the present invention establishes a maximum DSV value and, moreover, selects particular m-bit code words in a manner such that the overall DSV is reduced toward zero. Thus, by placing constraints upon the particular code words which may be generated, successive code words will have a minimal DC component.

Turning now to FIG. 1, there is illustrated a typical 5-bit code word wherein m=5. It is assumed herein, and throughout the specification, that a binary "1" is represented by a positive DC level (+1) and a binary "0" is represented by an equal but opposite, or negative, DC level (−1). The illustrated 5-bit word [10010] has a disparity of −1, because the number of "0"s exceeds the number of "1"s by one. If the 5-bit word illustrated in FIG. 1 is the only digital word to be transmitted, then the DSV also is equal to −1.

As will be described in greater detail below, in accordance with the present invention, an n-bit information word may be represented by two m-bit code words: one code word having positive disparity and the other code word having negative disparity, if m is odd. If the digital sum variation of the preceding m-bit code words is positive, then the n-bit information word is represented by a negative-disparity code word. Conversely, if the digital sum variation of the preceding code words is negative, then the information word to-be-encoded is represented by a positive-disparity code word.

FIG. 2 represents a table in which the positive-disparity and negative-disparity 5-bit code words for each 4-bit information word are represented. Furthermore, this table also presents the digital representation of each positive and negative disparity, with the negative disparities being presented as the two's complement. Thus, and as is shown, the information word [0000] may be represented either as the code word [00000], referred to in the table of FIG. 2 as a CODE+ word, or by the code word [11111], referred to as the CODE− word. The disparity of the CODE+ word is equal to −5, and the digital representation of this −5 disparity, in two's complement form, is [1011]. The disparity of the CODE− word is equal to +5 which, in digital form, is represented as [0101]. Similarly, information word [0001] is represented by the CODE+ word [00001] whose disparity of −3 is represented as [1101]; and this information word also is represented by the CODE− word [11110] whose disparity of +3 is represented as [0011]. Thus, from the table illustrated in FIG. 2, it is seen that each 4-bit information word is represented by a 5-bit CODE+ word and by a 5-bit CODE− word. Each CODE+ word has a prefix bit, that is, a most significant bit, equal to "0"; and each CODE− word has its prefix, or most significant bit, equal to "1". Furthermore, it is appreciated that, since each code word is comprised of an odd number of bits, the disparity of that code word, whether positive or negative, is an odd magnitude. Hence, the digital representation of the disparity of each CODE+ and each CODE− word has its least significant bit presented as a "1", thus being indicative of such odd disparity.

In the table of FIG. 2, it is appreciated that each CODE+ word is formed by providing a binary "0" as the most significant bit, and adding this binary "0" as the prefix to the 4-bit information word. That is, the second, third, fourth and fifth bits of each CODE+ word are equal to the respective bits of the original information word. The CODE− word is comprised of a binary "1" as the most significant bit, and the second, third, fourth and fifth bits, respectively, are complements, or inverted versions, of the original information word. It is appreciated that each code word, be it a CODE+ or a CODE− word, is representative of a single, corresponding information word; whereas each information word is represented by two code words, one having positive disparity and the other having negative disparity.

Figure 3:
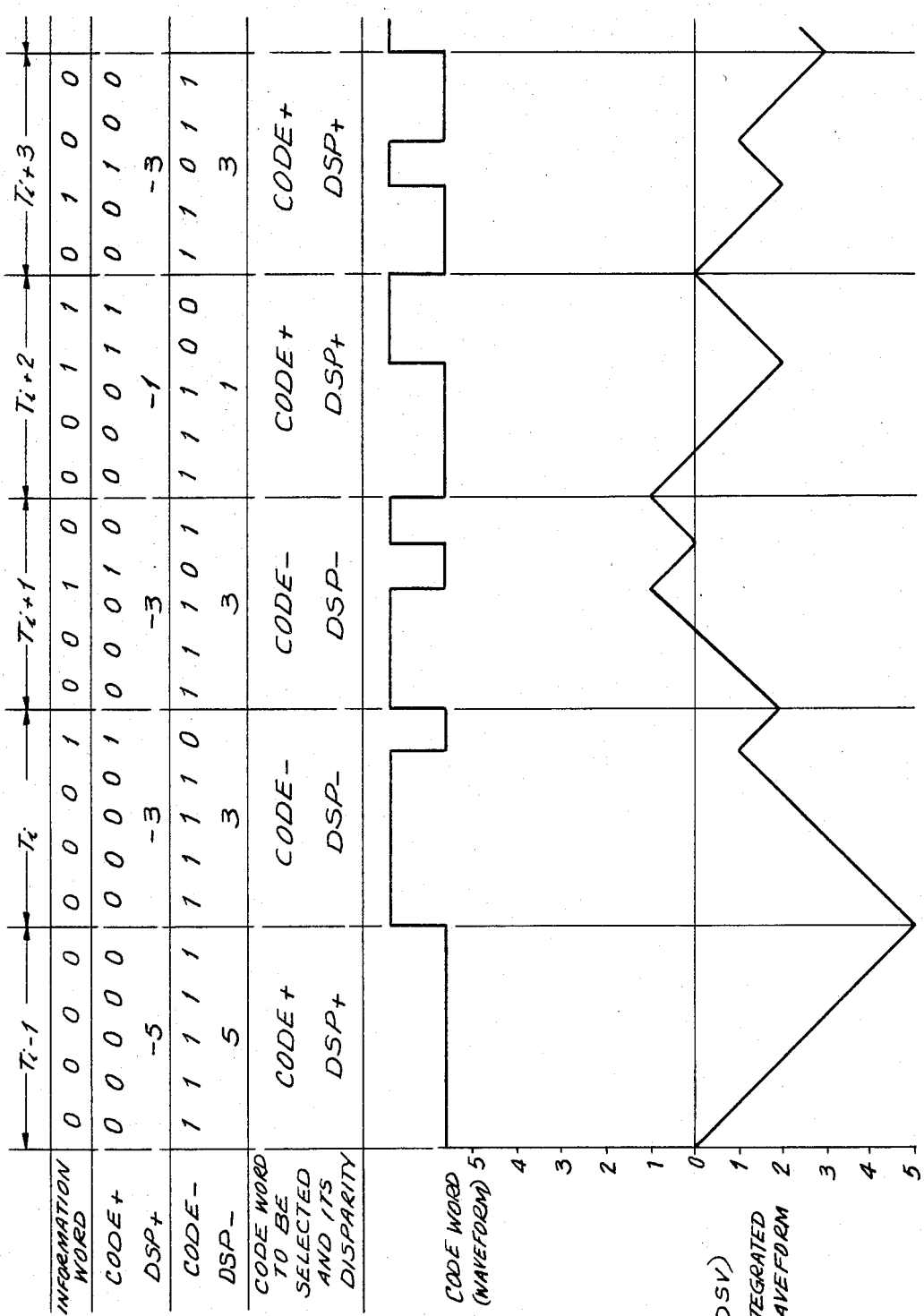
FIGS. 3A-3F are timing and waveform diagrams which are useful in understanding the present invention.

A general description of the theory of operation of the present invention now will be described with reference to FIGS. 3A–3F. Let it be assumed that, as shown in FIG. 3A, the following successive information words are presented to be encoded: [0000], [0001], [0010], [0011] and [0100]. These successive information words are presented in consecutive periods $T_{i-1}$, $T_i$, $T_{i+1}$, $T_{i+2}$ and $T_{i+3}$, respectively. FIGS. 3B and 3C illustrate the CODE+ and CODE− words which are representative of each of the aforementioned respective information words. Furthermore, the disparity of each of these illustrated code words also is indicated. FIG. 3D illustrates the particular code word which is selected, that is, the particular code word which is used to represent the respective information word; FIG. 3E is a waveform representation of the selected code words; and FIG. 3F is a waveform of the digital sum variation which is calculated for each successive bit of the selected code words.

Initially, that is, in period $T_{i-1}$, information word [0000] is assumed to be represented by CODE+ word [00000], having a disparity of $-5$. In FIG. 3F, the DSV is calculated for each successive bit of the CODE+ word, wherein it has been assumed that, initially, the DSV is equal to zero. Thus, and as shown, the overall DSV of the code word which is transmitted during period $T_{i-1}$ is equal to $-5$.

In the next-following period $T_i$, information word [0001] is presented for encoding. Since the DSV at the beginning of period Ti is equal to $-5$, the particular code word which is selected to represent the information word [0001] is the one code word which has a positive disparity. Hence, since the DSV is of negative polarity, the CODE− word is selected. At the completion of period $T_i$, the overall DSV is seen to be equal to the DSV at the start of period $T_i$ plus the disparity of the selected code word. Hence, the overall DSV which is calculated for periods $T_{i-1}$ and $T_i$ is: $DSV = -5 + 3 = -2$.

At period $T_{i+1}$, the information word [0010] is presented for encoding. Since the DSV at the start of this period is equal to $-2$, the code word which is selected to represent this information word is the CODE− word having a disparity of +3. Thus, during period $T_{i+1}$, the code word [11101] is selected to represent information word [0010]. From FIG. 3F, it is seen that, at the completion of period $T_{i+1}$, the overall DSV which has been calculated for the periods $T_{i-1}$, $T_i$ and $T_{i+1}$ is equal to +1.

Thus, during the next-following period $T_{i+2}$, the information word [0011] is represented by the CODE+ word having negative disparity. At the completion of period $T_{i+2}$, the overall DSV for the preceding code words is calculated to be equal to zero. During the next-following period $T_{i+3}$, the information word [0100] may be represented by either the CODE+ or the CODE− word. FIG. 3D represents that the CODE+ word is selected, resulting in an overall DSV for the transmitted code words of $-3$.

From FIGS. 3A-3F it is appreciated that the particular encoding of an information word is based upon the digital sum variation which has been calculated for those preceding code words. If the DSV is of positive polarity, then the information word to-be-encoded is represented by the code word having negative disparity. Conversely, if the DSV has been calculated to be of negative polarity, the information word is represented by a code word having positive disparity. From FIG. 3F, it is recognized that the overall DSV tends to be reduced in a direction towards zero. That is, in the present example, the maximum value of the DSV is ±5, and the code word which is selected to represent the information word to-be-encoded exhibits a disparity so as to reduce the DSV from its maximum level towards zero.

Figure 4:
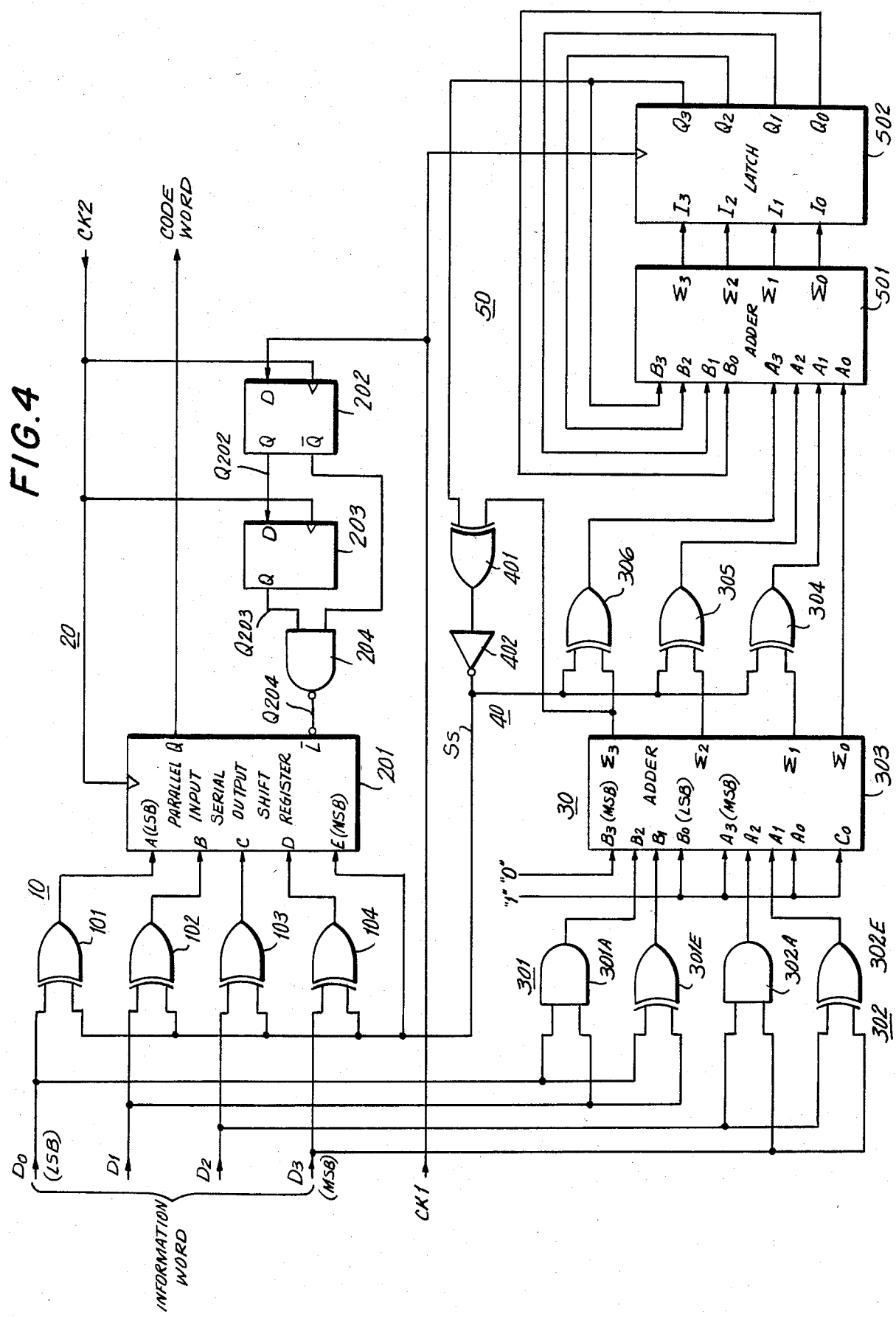
FIG. 4 is a logic diagram of one embodiment of an encoder in accordance with the present invention.

One embodiment of encoding circuitry which operates in accordance with the aforedescribed theory of operation is illustrated in FIG. 4. This encoder is comprised of a code converting circuit 10, a parallel-to-serial converter 20, a disparity calculating circuit 30, a selection signal generating circuit 40 and a DSV determining circuit 50. Let it be assumed, for the purpose of the present discussion, that the illustrated encoding circuitry is adapted to convert a 4-bit information word into a 5-bit code word (i.e. n=4 and m=5). Accordingly, in the illustrated embodiment, code converting circuit 10 is comprised of exclusive-OR circuits 101, 102, 103 and 104, each having a first input adapted to receive a respective bit of the 4-bit information word, and a second input adapted to receive a selection signal $S_s$, to be described. As is known, an exclusive-OR circuit is adapted to produce a binary "1" when the respective inputs thereto differ from each other (that is, one input is a binary "1" and the other is a binary "0") and to produce a binary "0" when both inputs thereto are the same (that is, both inputs are a binary "0" or a binary "1"). Thus, in accordance with the conventional operation of an exclusive-OR circuit, if one of the inputs thereto is a binary "1", the exclusive-OR circuit operates to invert the logic state of the other input supplied thereto. Conversely, if one of the inputs to the exclusive-OR circuit is a binary "0", the circuit operates merely to pass the logic state of the other input signal supplied thereto. Hence, in the illustrated embodiment, if selection signal $S_s$ is a binary "0", then the respective states of bits $D_3$, $D_2$, $D_1$ and $D_0$ of the 4-bit information word are passed through exclusive-OR circuits 104, 103, 102 and 101, respectively, substantially as is. However, if selection signal $S_s$ is a binary "1", then exclusive-OR circuits 104, 103, 102 and 101 function to invert the logic conditions of each of bits $D_3$, $D_2$, $D_1$ and $D_0$, respectively. Furthermore, code converting circuit 10 also includes, as the fifth and most significant bit of the 5-bit code word, the logic condition of selection signal $S_s$.

It is appreciated that the code converting circuit operates to produce a 5-bit parallel word in response to each 4-bit information word supplied thereto. The most significant bit of this 5-bit code word is either a binary "0" or a binary "1", depending upon the logic condition of selection signal $S_s$. If this selection signal is a binary "0", then the remaining four bits of the code word are equal to the four bits of the information word, respectively. However, if the selection signal is a binary "1", then the remaining four bits of the code word are the complements, or inverted versions, of the respective four bits of the information word. It is seen, therefore, that code converting circuit 10 functions to produce the CODE+ or the CODE− words of the table illustrated in FIG. 2, the particular selection of either the CODE+ or CODE− word being determined by the logic condition of selection signal $S_s$.

Parallel-to-serial converter 20 is comprised of a parallel-input/serial-output shift register 201 and a load-shift control circuit coupled to this shift register and comprised of D-type filip-flop circuits 202 and 203 and a NAND gate 204. Shift register 201 is comprised of input terminals E, D, C, B and A connected to code converting circuit 10 to receive the corresponding bits of the 5-bit parallel code word. The most significant bit of this code word is supplied to input terminal e, with bits of lesser significance applied to input terminals D, C, B and A, the bit of least significance being applied to input terminal A. The Q output of shift register 201 provides a serialized version of the 5-bit code word, the most significant bit being shifted from the shift register first and then followed by the remaining bits in the order of lesser significance.

Parallel-input/serial-output shift register 201 also includes a load input terminal L which, when supplied with a binary "0" load signal permits the shift register to be loaded with the 5-bit parallel code word supplied thereto, and when supplied with a binary "1" shift signal functions to shift the code word out to output terminal Q serially-by-bit, in response to shift clock pulses supplied to the clock pulse input terminal thereof. D-type flip-flop circuits 202 and 203 and NAND gate 204 function as a shift register control circuit and are responsive to shift clock pulses CK2 and also to control clock pulses CK1 to generate the load/shift control signal which is applied to the $\overline{L}$ input terminal of shift register 201.

A D-type flip-flop circuit includes a D input terminal to receive a data bit, and also includes a timing pulse input terminal to receive a clock signal. The D-type flip-flop circuit is set to a first state in response to a positive transition at its timing pulse input terminal, provided that a binary "1" then is in the process of being supplied to its D input terminal. If a binary "0" is in the process of being supplied to its D input terminal, the flip-flop circuit is reset to a second state. The set, or first state of the flip-flop circuit is represented by a binary "1" at the Q output thereof, and by a binary "0" at the $\overline{Q}$ output thereof. The reset, or second state of the D-type flip-flop circuit is represented by a binary "0" at its Q output and by a binary "1" at its $\overline{Q}$ output.

As shown in FIG. 4, the D input terminal of flip-flop circuit 202 is connected to receive control clock pulses CK1, and the timing pulse input terminal is connected to receive shift clock pulses CK2. The Q output of flip-flop circuit 202 is connected to the D input terminal of flip-flop circuit 203; and the timing pulse input terminal of this latter flip-flop circuit is connected to receive shift clock pulses CK2. The Q output of flip-flop circuit 203, together with the $\overline{Q}$ output of flip-flop circuit 202 are connected to respective inputs of NAND gate 204, the output of which is coupled to the $\overline{L}$ input terminal of shift register 201.

Before describing disparity calculating circuit 30, selection signal generating circuit 40 and DSV determining circuit 50, an explanation will be provided of the operation of parallel-to-serial converter 20. With reference to the timing diagrams shown in FIGS. 5A–5H, let it be assumed that successive 4-bit parallel information words are supplied to code converting circuit 10 at successive periods $T_{i-1}$, $T_i$, $T_{i+1}$, and so on. The code converting circuit functions to generate a respective 5-bit code word in response to each 4-bit information word supplied thereto, the particular representation of each information word being based upon the DSV which has been determined for the preceding code words, as will be described. As shown in FIG. 5B, successive 5-bit parallel code words are produced at the beginning of each period $T_{i-1}$, $T_i$, $T_{i+1}$, . . . ; and each 5-bit code word is supplied to the respective input terminals A–E of shift register 201. It is appreciated that each code word subsists for the duration of its respective period.

Control clock pulses CK1 exhibit the rectangular waveform shown in FIG. 5C, and shift clock pulses CK2 have a frequency that is five times the frequency of control clock pulses CK1, as shown in FIG. 5D. The shift and control clock pulses may be derived from a common clock pulse generator, as is conventional. The state of flip-flop circuit 202 follows the state of control clock pulses CK1, as shown in FIG. 5E. That is, flip-flop circuit 202 is set in response to a positive transition in shift clock pulse CK2, provided that control clock pulse CK1 admits of its relatively higher level. Similarly, flip-flop circuit 202 is reset at a positive transition in shift clock pulse CK2, provided that control clock pulse CK1 then admits of its relatively lower level. Flip-flop circuit 203 follows the state of flip-flop circuit 202 and is delayed therefrom by one period of shift clock pulses CK2. The state of flip-flop circuit 203, as represented by the state of output signal $Q_{203}$ provided at the Q output thereof, is illustrated in FIG. 5F.

NAND gate 204, which produces a binary "0" only in response to a binary "1" supplied to each of its inputs, receives an inverted version of output signal $Q_{202}$, this inverted version being produced at the $\overline{Q}$ output of flip-flop circuit 202, and also receives output signal $Q_{203}$ provided at the Q output of flip-flop circuit 203. Thus, and as illustrated in FIGS. 5E–5G, NAND gate 204 produces the load/shift control signal $Q_{204}$ having a binary "1" level whenever the $Q_{202}$ output signal is a binary "1" or whenever the $Q_{203}$ output signal is a binary "0". When the binary "0" level of output signal $Q_{202}$ coincides with the binary "1" level of output signal $Q_{203}$, NAND gate 204 generates the binary "0" load signal $Q_{204}$. At all other times, NAND gate 204 generates the binary "1" shift signal $Q_{204}$. As shown in FIG. 5H, the 5-bit parallel code word which is supplied to input terminals A–E of shift register 201 at the time that the binary "0" load signal is produced is loaded into the shift register, and the contents of this shift register are serially shifted out therefrom, at its output terminal Q, in synchronism with each shift clock pulse CK2, whenever NAND gate 204 generates the binary "1" shift signal. Thus, parallel-to-serial converter 20 serves to convert the parallel 5-bit code word generated by code converting circuit 10 into a serial bit code word. This code word then may be modulated, such as by an NRZ modulator, transmitted, recorded, or otherwise processed.

Disparity calculating circuit 30 functions to calculate the disparity of each 5-bit code word which is produced by code converting circuit 10. It is recalled that disparity (DSP) is represented as $DSP = n_1 - n_0$; and $n_1 + n_0 = m$ (wherein m=5). Thus, $DSP = 2n_1 - 5$. Disparity calculating circuit 30 functions to calculate the disparity in accordance with this last-mentioned equation and, additionally, to provide a digital representation of the calculated disparity. From the table illustrated in FIG. 2, it is appreciated that, if selection signal $S_s$ is a binary "0", such that the CODE+ word is selected, then the disparity of the CODE+ word may be determined from the original information word. Similarly, If selection signal $S_s$ is a binary "1" such that the CODE− word is selected, the disparity of this CODE− word may be determined from the original information word. Disparity calculating circuit 30 includes a counting circuit which functions to count the number of binary "1"s included in the original information word, this counting circuit being comprised of a circuit 301 for counting the number of "1"s included in the two least significant bits of the information word, and a circuit 302 for counting the number of binary "1"s included in the two most significant bits of the information word. Circuits 301 and 302 are coupled to a full adder 303 which serves to double the counted number of binary "1"s and to subtract the number "5" therefrom. More particularly, circuit 301 is comprised of an AND gate 301A and an exclusive-OR circuit 301E, the AND gate and exclusive-OR circuit having their inputs connected in common to receive the least significant bits $D_0$ and $D_1$ of the information word. Similarly, circuit 302 is comprised of an AND gate 302A and an exclusive-OR circuit 302E whose inputs are connected in common to receive the most significant bits $D_2$ and $D_3$ of the information word. It is seen that, if a binary "1" is not included in either bit of the pair of bits supplied to the respective circuit 301 or 302, both the AND gate and the exclusive-OR circuit included therein produce binary "0"s. If only one binary "1" is present in the pair of bits, the exclusive-OR circuit produces a binary "1" while the AND gate produces a binary "0". If a binary "1" is included in both of the bits supplied to the respective circuit 301 or 302, the AND gate produces a binary "1" and the exclusive-OR circuit produces a binary "0". Thus, the number of binary "1"s included in the 4-bit information word is represented by the respective signals produced by the AND gates and exclusive-OR circuits which comprise circuits 301 and 302.

The output of AND gate 301A, which is a binary "1" only if bits $D_0$ and $D_1$ of the information word both are a binary "1", is supplied to input terminal $B_2$ of full adder 303. The output of exclusive-OR circuit 301E, which is a binary "1" only if one of bits $D_0$ and $D_1$ is a binary "1", is coupled to input terminal $B_1$ of the full adder. The output of AND gate 302A, which is a binary "1" only if both of bits $D_2$ and $D_3$ of the information word are a binary "1", is coupled to input terminal $A_2$ of full adder 303. The output of exclusive-OR circuit 302E, which is a binary "1" only if one of bits $D_2$ and $D_3$ of the information word is a binary "1", is coupled to input terminal $A_1$ of the full adder. The full adder is adapted to sum two 4-bit words supplied thereto. More particularly, the binary signals supplied to input terminals $A_0$, $A_1$, $A_2$ and $A_3$ are summed with the binary signals supplied to input terminals $B_0$, $B_1$, $B_2$ and $B_3$, respectively. The binary signals which are supplied to input terminals $A_1$ and $A_2$, and also to input terminals $B_1$ and $B_2$ have been described above. In addition to these, a binary "1" is supplied to input terminals $A_0$ and $A_3$, and also to input terminal $B_0$. Thus, of the 4-bit word which is supplied to the "A" input terminals of full adder 303, a binary "1" is preset at input terminals $A_0$ (the least significant bit) and $A_3$ (the most significant bit). In the 4-bit word supplied to the "B" input terminals of the full adder, a binary "1" is preset at input terminal $B_0$ (the least significant bit), and a binary "0" is preset at input terminal $B_3$ (the most significant bit). In addition, an input carry terminal $C_0$ also is supplied with a binary "1". A digital representation of the full addition of the binary word supplied to the "A" inputs to the binary word supplied to the "B" inputs is provided at output terminals $\Sigma_0$, $\Sigma_1$, $\Sigma_2$ and $\Sigma_3$. That is, a 4-bit digital representation of the calculated disparity is provided at these output terminals of full adder 303.

It will be appreciated by one of ordinary skill in the art that the selective presetting of binary "1"s and "0"s at the particular input terminals of full adder 303 serves to double the number of binary "1"s which have been counted in the original information word, and the number "5" is subtracted therefrom. The result of this digital manipulation is the calculated disparity of the original information word. This calculated disparity is presented as a 4-bit digital representation at output terminals $\Sigma_0$, $\Sigma_1$, $\Sigma_2$ and $\Sigma_3$, with the most significant bit of this digital representation being provided at output terminal $\Sigma_3$ and the least significant bit thereof being provided at output terminal $\Sigma_0$. It also is appreciated that the bit provided at output terminal $\Sigma_0$ is equal to the sum of the bits provided at input terminals $A_0 + B_0 + C_0$. More particularly, this least significant bit produced at output terminal $\Sigma_0$ always is a binary "1". This conforms with the disparity which is calculated for each CODE+ and each CODE— word illustrated in the table of FIG. 2.

The disparity which is represented by the digital representation produced by full adder 303 is the disparity of the CODE+ word which corresponds to the original information word. It is recalled that the most significant bit of this CODE+ word is a binary "0"; and this most significant bit is equal to the selection signal $S_s$. Thus, this digital representation of the disparity is correct if the original information word is encoded into a CODE+ word. However, and as is apparent from the table illustrated in FIG. 2, if the original information word is encoded into a CODE— word, then the polarity, or sign, of the calculated disparity must be inverted. It is seen that if the original information word [0000] is represented by the CODE+ word [00000], the calculated disparity is equal to —5, and the digital representation of —5 is seen to be [1011]. This digital representation is in two's complement form. Moreover, this digital representation is produced at the output of full adder 303 in response to the information word [0000]. However, if the information word is to be represented by the CODE— word [11111], then the calculated disparity is equal to +5 whose digital representation is [0101]. Similarly, if the original information word is [0010], then its encoding into a CODE+ word is represented as [00010] whose disparity of —3 is digitally represented as [1101]. If this information word is encoded into the CODE— word [11101], then its disparity of +3 is represented as [0011]. As yet another example, if the original information word is [0111], then the encoding of this information word into the CODE+ word is represented as [00111], whose disparity of +1 is digitally represented as [0001]; and the encoding of this information word into the CODE— word is represented as [11000] whose disparity of —1 is digitally represented as [1111]. The digital representation produced by full adder 303 corresponds to the disparity of the CODE+ word and is determined directly from the respective bits of the original information word. However, if the information word is to be represented by its CODE— word, wherein the most significant bit of the CODE— word is a binary "1", which most significant bit is equal to the selection signal $S_s$, then the digital representation produced at the outputs of the full adder is modified. More particularly, it is seen, from the table illustrated in FIG. 2, that the absolute magnitude of the disparity of the CODE+ and CODE— words which represent the same information word is identical, but the polarity, or sign, of that disparity is reversed. That is, the disparity of each CODE+ word is the two's complement of the disparity of each CODE— word. Hence, once the disparity of the CODE+ word is determined, as at the outputs of full adder 303, if the CODE— word is to be selected, then the two's complement of the calculated disparity is produced.

The selection of the two's complement of the calculated disparity is obtained by exclusive-OR circuits 304, 305 and 306 in response to the condition, or state, of selection signal $S_s$. More particularly, the most significant bit of the digital representation of the disparity, as produced at the $\Sigma_3$ output of full adder 303, is supplied to one input of exclusive-OR circuit 306, the other input thereof being supplied with selection signal $S_s$. Likewise, the bits of lesser significance of the digital representation of disparity, that is, the bits produced at outputs $\Sigma_2$ and $\Sigma_1$ of full adder 303, are supplied to respective inputs of exclusive-OR circuits 305 and 304, the other input of each exclusive-OR circuit being supplied with selection signal $S_s$. It is appreciated that, if selection signal $S_s$ is a binary "0", whereby the CODE+ word representing the information word is to be selected, then exclusive-OR circuits 304-306 pass bits $\Sigma_1$-$\Sigma_3$, respectively, as is. However, if selection signal $S_s$ is a binary "1", resulting in the selection of the CODE− word to represent the original information word, then the complements of the respective bits $\Sigma_1$-$\Sigma_3$ are produced by exclusive-OR circuits 304-306 respectively. The binary "1" produced at output $\Sigma_0$ for all digital representations of disparity of the CODE+ words remains as is, regardless of whether selection signal $S_s$ is a binary "0" or a binary "1". This is because the calculated disparity is an odd number which requires that the least significant bit of its digital representation be a binary "1".

The outputs of exclusive-OR circuits 306, 305 and 304, together with the least significant bit provided at output terminal $\Sigma_0$ of full adder 303, provide the actual digital representation of the disparity which has been calculated for the particular code word that is used to represent the original information word. That is, regardless of whether the information word is represented by the CODE+ word or by the CODE− word, the digital representation of the correct disparity is presented at the outputs of these exclusive-OR circuits, together with output terminal $\Sigma_0$ of full adder 303. The most significant bit, that is, the bit provided at the output of exclusive-OR circuit 306, represents the polarity of the disparity (a binary "1" represents negative disparity and a binary "0" represents positive disparity), and the remaining bits represent the absolute magnitude thereof.

Selection signal generating circuit 40 is comprised of an exclusive-OR circuit 401 whose output is coupled to an inverter 402. The purpose of exclusive-OR circuit 401 is to compare the polarity of the DSV derived from the preceding code words with the polarity of the CODE+ word which represents the information word to-be-encoded. This comparison is effected by comparing the most significant bit of the disparity for the CODE+ word, that is, the bit produced at the $\Sigma_3$ output of full adder 303, with the most significant bit of the digital representation of the DSV. If the polarity, or sign, of the disparity is equal to the polarity, or sign, of the DSV, then exclusive-OR circuit 401 produces a binary "0". This binary "0" is inverted by inverter 402 and supplied as a binary "1" selection signal $S_s$. Consequently, the CODE− word is selected to represent the input information word and, moreover, the two's complement of the disparity represented at the outputs of full adder 303 is provided to represent the disparity of this CODE− word. Conversely, if the polarities of the disparity and DSV differ from each other, exclusive-OR circuit 401 produces a binary "1" which is inverted by inverter 402 to produce the binary "0" selection signal $S_s$. As a result thereof, the input information word is represented by the CODE+ word whose disparity corresponds to the disparity represented at the outputs of full adder 303. That is, the two's complement of this calculated disparity is not produced.

It may be appreciated that selection signal generating circuit 40 initially controls code converting circuit 10 such that, in general, the CODE+ word preliminarily is selected. In the event that the disparity of this CODE+ word would result in an increase in the DSV, the preliminary selection is changed over such that the CODE− word is loaded into shift register 201. Once the proper code word is selected, the DSV is updated. That is, the DSV which had been determined as a function of the preceding code words is updated so as to be based, in addition, upon the present code word which now is serially transmitted from shift register 201.

It is recalled that the DSV represents the overall DC level, or component, of those code words which have been transmitted. When the next-following code word is transmitted, the DSV is changed accordingly. More particularly, the updated DSV is determined by summing the current DSV, that is, the DSV which is based upon the preceding code words, with the disparity of the next-following code word, that is, the disparity of the code word which has been loaded into shift register 201. DSV determining circuit 50 is adapted to perform this summing operation. The DSV determining circuit is comprised of a full adder 501 and a latch circuit 502. Full adder 501 may be similar to full adder 303 and includes a set of "A" inputs and a set of "B" inputs. The "A" inputs are supplied with the digital representation of the disparity of the 5-bit code word which has been loaded into shift register 201. The "B" inputs are supplied with the digital representation of the current DSV, that is, the DSV which has been determined for the preceding code words. Outputs $\Sigma_0$, $\Sigma_1$, $\Sigma_2$ and $\Sigma_3$ of full adder 501 provide a 4-bit digital representation of the updated DSV, which representation is equal to the sum of the current DSV and the disparity of the next-following code word. This digital representation of the updated DSV is supplied to inputs $I_0$, $I_1$, $I_2$ and $I_3$ of latch circuit 502. This latch circuit is conventional and includes a load input connected to receive control clock pulses CK1. A positive transition in a control clock pulse CK1 enables latch circuit 502 to store the 4-bit digital representation of the updated DSV. The latch circuit also includes output terminals $Q_0$, $Q_1$, $Q_2$ and $Q_3$ to provide the updated, stored DSV. Output terminal $Q_3$ provides the most significant bit of the updated DSV, and output terminal $Q_0$ provides the least significant bit thereof. It is appreciated that the most significant bit of the DSV represents its polarity, or sign. This most significant bit is supplied to exclusive-OR circuit 401 whereat it is compared with the most significant bit, or sign bit, of the disparity of the CODE+ word which may be selected to represent the input information word.

The manner in which the encoding circuitry illustrated in FIG. 4 operates now will be briefly described, with specific reference to the successive information words which are illustrated in FIG. 3A. Initially, let it be assumed that the DSV which had been determined for the preceding code words, that is, the code words which were transmitted prior to period $T_{i-1}$, is equal to zero. At the beginning of period $T_{i-1}$, the information word [0000] is supplied to code converting circuit 10. AND gate 301A and exclusive-OR circuit 301E both supply binary "0"s to the $B_2$ and $B_1$ inputs, respectively, of full adder 303, representing that a binary "1" is not present in either of the pair of bits $D_0$ and $D_1$ of the information word. Similarly, AND gate 302A and exclusive-OR circuit 302E both supply binary "0"s to input terminals $A_2$ and $A_1$, respectively, of full adder 303, thus representing that a binary "1" is not present in either of bits $D_2$ and $D_3$ of the information word. Accordingly, full adder 303 adds the digital numbers [0001] and [1001] at the "B" and "A" input terminals, respectively, and also the "carry bit" preset at input terminal $C_0$. As a result of this addition, full adder 303 produces the digital representation [1011] at output terminals $\Sigma_3$, $\Sigma_2$, $\Sigma_1$ and $\Sigma_0$, respectively. This is the disparity of the CODE+ word which, preliminarily, is selected by code converting circuit 10.

Exclusive-OR circuit 401 compares the most significant bit of this disparity with the most significant bit of the digital representation of the DSV stored in latch circuit 502. It has been assumed that this stored DSV is equal to zero, as represented by [0000]. It is seen, therefore, that exclusive-OR circuit 401 is supplied with a binary "1" from output terminal $\Sigma_3$ of full adder 303, and with a binary "0" from output terminal $Q_3$ of latch circuit 502. Hence, the exclusive-OR circuit produces a binary "1" which is inverted by inverter 402 to a binary "0" selection signal $S_s$. This selection signal is supplied as the most significant bit of the code word loaded into shift register 201, and the remaining bits of this code word are constituted by the bits $D_3$, $D_2$, $D_1$ and $D_0$ of the input information word. That is, the CODE+ word [00000] is loaded into the shift register. Also, the digital representation of the disparity, as produced at the output terminals of full adder 303, are supplied, as is, through exclusive-OR circuits 304, 305 and 306 to the "A" input terminals of full adder 501. The "B" input terminals of this full adder are supplied with the digital representation of the DSV stored in latch circuit 502. Thus, the "B" input terminals are supplied with the DSV representation [0000].

After being loaded into shift register 201, the CODE+ word [00000] is serially shifted out from output terminal Q. As this code word is serially shifted, the updated DSV, that is, the resultant produced by summing the disparity supplied to the "A" inputs of full adder 501 to the DSV supplied to the "B" inputs thereof, is stored in latch circuit 502. Since the DSV for the preceding code words has been assumed to be equal to zero, it is appreciated that the updated DSV, as now stored in latch circuit 502, is equal to the disparity of the code word which now is being transmitted, that is, the updated DSV is equal to −5.

At the beginning of the next-following period $T_i$, the input information word is seen to be equal to [0001], shown in FIG. 3A. AND gate 301A supplies a binary "0" to input terminal $B_2$ of full adder 303, thus representing that both bits $D_0$ and $D_1$ of the input information word are not binary "1"s. Exclusive-OR circuit 301E supplies a binary "1" to input terminal $B_1$, thereby representing that one of the $D_0$ and $D_1$ bits is a binary "1". Since neither the $D_2$ bit nor the $D_3$ bit is a binary "1", AND gate 302A and exclusive-OR circuit 302E both supply binary "0"s to input terminals $A_2$ and $A_1$. Thus, the digital representation [0011] supplied to the "B" inputs is added to the digital representation [1001] supplied to the "A" inputs, together with the binary "1" "carry input", thereby resulting in the digital representation [1101] at the output terminals of the full adder. This corresponds to a calculated disparity of −3, in the event that the input information word is encoded into a CODE+ word.

The sign of this calculated disparity is equal to the sign of the DSV stored in latch circuit 502. It is recalled that the stored DSV is equal to −5. Thus, the most significant bit produced at the $\Sigma_3$ and $Q_3$ output terminals of full adder 303 and latch circuit 502, respectively, both are equal to binary "1". As a result thereof, exclusive-OR circuit 401 produces a binary "0" which is inverted to a binary "1" selection signal $S_s$. This binary "1" selection signal results in the selection of the CODE− word to represent the input information word. The most significant bit of this CODE− word is equal to the binary "1" selection signal $S_s$, and the remaining four bits of the code word are inverted versions, or complements, of the respective bits of the input information word. Thus, shift register 201 is loaded with the code word [11110]. The disparity of the CODE− word which has been loaded into shift register 201 is produced at the outputs of exclusive-OR circuits 304, 305 and 306, together with the least significant bit produced at output terminal $\Sigma_0$ of full adder 303. Since selection signal $S_s$ is a binary "1", the three most significant bits of the calculated disparity, as represented at the output terminals $\Sigma_3$, $\Sigma_2$ and $\Sigma_1$ of full adder 303, all are inverted. Thus, the digital representation of the disparity of the CODE− word which has been loaded into shift register 201 is supplied to the "A" inputs of full adder 501 as [0011], this digital representation corresponding to a disparity of +3. It is seen that, since the DSV of the preceding code words, as represented by the digital representation stored in latch circuit 502, is of negative polarity, the particular code word which is selected to represent the input information word should have positive disparity. The CODE+ word which represents the input information word in this example is of negative disparity, and the CODE− word which represents this input information word is of positive disparity. Hence, selection signal generating circuit 40 produces a binary "1" selection signal $S_s$, whereupon the CODE− word is selected.

Full adder 501 sums the digital representation of the disparity of the CODE− word which has been loaded into shift register 201 with the digital representation of the current DSV. Thus, the disparity of +3 is added to the DSV of −5, thereby resulting in an updated DSV of −2 which is represented at output terminals $\Sigma_3$, $\Sigma_2$, $\Sigma_1$ and $\Sigma_0$ of full adder 501 by the digital representation [1110]. As the code word stored in shift register 201 is serially shifted out therefrom, this updated DSV is stored in latch circuit 502. Thus, the digital representation of the current DSV, as provided at output terminals $Q_3$, $Q_2$, $Q_1$ and $Q_0$ of latch circuit 502 is equal to [1110].

Now, at the beginning of the next-following period $T_{i+1}$, let it be assumed that the information word [0010] is presented. Only one binary "1" is present in the pair of bits $D_0$ and $D_1$, and no binary "1"s are present in the pair of bits $D_2$ and $D_3$. Hence, the "B" input terminals of full adder 303 are supplied with the representation [0011]. The "A" input terminals of this full adder are supplied with the representation [1001]. Full adder 303 thus produces, at its output terminals $\Sigma_3$–$\Sigma_0$, the digital representation [1101], representing that, if the CODE+ word is selected to represent the input information word, the disparity of this CODE+ word is equal to −3. Since the disparity of the CODE+ word is of the same polarity as the DSV for the preceding code words, that is, both are negative, exclusive-OR circuit 401 produces a binary "0". Inverter 402 inverts this binary "0" to a binary "1" selection signal, thereby selecting the CODE− word to represent the input information word. The CODE− word [11101] is loaded into shift register 201. Furthermore, since selection signal $S_s$ is a binary "1", the three most significant bits of the digital representation of the disparity produced at the output terminals of full adder 303 all are inverted. Hence, the "A" inputs of full adder 501 are supplied with the digital representation [0011], which represents that the CODE− word loaded into shift register 201 has a disparity of +3.

After the CODE− word is loaded into shift register 201, it is serially shifted out therefrom. The current DSV, as stored in latch citcuit 502, then is updated by summing this current DSV with the calculated disparity. That is, the current DSV of −2 [1110] is summed with the disparity of +3 [0011], resulting in an updated DSV of [0001], or +1.

At the next-following period $T_{i+2}$, the input information word is assumed to be [0011], as shown in FIG. 3A. Since both of bits $D_0$ and $D_1$ are binary "1"s, and neither of bits $D_2$ and $D_3$ is a binary "1", it is seen that AND gate 301A produces a binary "1", and exclusive-OR circuit 301E, AND gate 302A and exclusive-OR circuit 302E all produce binary "0"s. Consequently, the digital signal supplied to the "B" input terminals of full adder 303 is represented as [0101], and is summed with the digital signal [1001] supplied to the "A" terminals, together with the "carry bit". Full adder 303 produces the digital representation [1111], corresponding to a disparity of −1, of the CODE+ word which can be selected to represent the information word [0011]. The most significant bit $\Sigma_3$ of this disparity is compared, in exclusive-OR circuit 401, to the most significant bit $Q_3$ of the current DSV, the latter being stored in latch circuit 502. It is recalled that the current DSV is equal to +1 [0001] and, consequently, the compared bits differ from each other. Hence, exclusive-OR circuit 401 produces a binary "1" which is inverted by inverter 402 to a binary "0" selection signal $S_s$. This means that the CODE+ word is selected to represent the input information word, this CODE+ word being constituted by selection signal $S_s$ as the most significant bit, and the remaining bits being equal to the bits which comprise the input information word. Hence, the code word [00011] is loaded into shift register 201.

Since selection signal $S_s$ is a binary "0", the two's complement of the calculated disparity is not produced. The "A" inputs of full adder 501 are, therefore, supplied with the disparity [1111] representing the disparity of the CODE+ word [00011] which had been loaded into shift register 201. This disparity is summed with the current DSV [0001], resulting in the updated DSV of [0000], as illustrated in FIG. 3F.

The foregoing operation is repeated with each new information word to-be-encoded. It is seen that the encoding circuitry of FIG. 4 functions to select one of the two code words which may be used to represent the information word as a function of the current DSV. That is, the code word whose disparity, when summed with the current DSV will reduce the DSV towards zero, is selected. If the current DSV is of positive polarity, the code word having negative disparity is selected. Conversely, if the current DSV is of negative polarity, the code word having positive disparity is selected. Furthermore, in the embodiment shown in FIG. 4, the disparity of the CODE+ word preliminarily is calculated and compared with the current DSV. If the polarity of the preliminarily calculated disparity differs from the polarity of the current DSV, then the preliminarily selected code word is loaded into shift register 201. However, if these polarities differ, then the complement, or inverted version, of the preliminarily selected code word is loaded into the shift register. The current DSV then is updated as a function of the disparity of the particular code word which actually had been loaded into the shift register.

Figure 6:
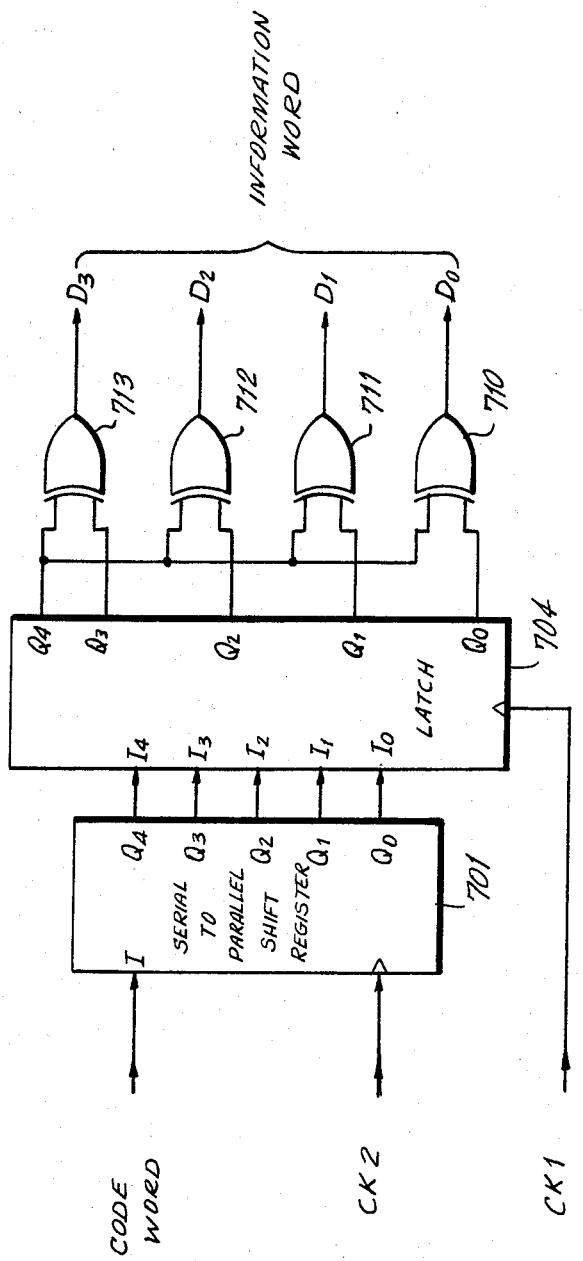
FIG. 6 is a logic diagram of one embodiment of a decoder which can be used with the present invention.

The code words which are produced by the encoding circuitry illustrated in FIG. 4 are detected and decoded by compatible decoding circuitry, one embodiment of which is illustrated in FIG. 6. The illustrated decoding circuitry is comprised of a serial-to-parallel shift register 701, a latch circuit 704 and exclusive-OR circuits 710, 711, 712 and 713. Serial-to-parallel shift register 701 is complementary to aforedescribed parallel-to-serial shift register 201 and is adapted to receive the 5-bit code word serially supplied to its input terminal I by, for example, a magnetic playback device, such as a digital VTR. This shift register also is adapted to receive shift clock pulses CK2 which may be similar to the shift clock pulses illustrated in FIG. 5D and described above. It is appreciated that each bit of the 5-bit code word received at input terminal I of shift register 701 is shifted, or clocked, into the shift register in response to each shift clock pulse CK2. When the received code word is fully shifted into shift register 701, the logic states of the respective bits thereof are provided at output terminals $Q_0$–$Q_4$, with the most significant bit being provided at output terminal $Q_4$ and the least significant bit being provided at output terminal $Q_0$. Thus, the serially received code word is provided as a parallel 5-bit word at output terminals $Q_0$–$Q_4$ of shift register 701.

Latch circuit 704 preferably comprises a conventional 5-bit latch circuit having a trigger, or load input terminal connected to receive control clock pulses CK1. Latch circuit 704 additionally includes input terminals $I_0$–$I_4$ connected to output terminals $Q_0$–$Q_4$, respectively, of shift register 701 to receive the parallel 5-bit code word which has been transmitted to the illustrated decoding circuitry. The parallel 5-bit code word supplied to latch circuit 704 by shift register 701 is stored in the latch circuit in response to, for example, a positive transition in the control clock pulse CK1. This control clock pulse may be similar to aforedescribed control clock pulse CK1, illustrated in FIG. 5C. As is appreciated, when latch circuit 704 is triggered in response to control clock pulse CK1, the parallel 5-bit code word is stored therein, and this stored code word is provided at output terminals $Q_0$–$Q_4$, with the most significant bit of the stored code word being provided at output terminal $Q_4$ and the least significant bit of the stored code word being provided at output terminal $Q_0$. Once the code word is transferred from shift register 701 to latch circuit 704, the shift register is enabled to respond to the next incoming code word and the code word now stored in the latch circuit can be processed.

From the aforedescribed explanation of the encoding circuitry, it is appreciated that, if the most significant bit of the received code word is a binary "0", then the remaining bits of the code word correspond, as is, to the original information word. Conversely, if the most significant bit of the received code word is a binary "1", then the remaining bits of the received code word are inverted versions, or complements, of the original information word. Exclusive-OR circuits 710–713 function to decode, or recover, the original information bits from the code word stored in latch circuit 704. More particularly, exclusive-OR circuits 710–713 have respective inputs connected to output terminals $Q_0$–$Q_3$, respectively, and another input connected in common to output $Q_4$ of the latch circuit. If the most significant bit of the received code word, as provided at output terminal $Q_4$ of the latch circuit, is a binary "0", then the remaining bits at output terminals $Q_3$-$Q_0$ pass through exclusive-OR circuits 713–710, respectively, as is. These bits correspond to the original four bits $D_3$-$D_0$ of the information word. However, if the most significant bit of the stored code word provided at output terminal $Q_4$ is a binary "1", then inverted versions, or complements, of each of the remaining bits of the code word, as provided at output terminals $Q_3$-$Q_0$ are produced by exclusive-OR circuits 713–710.

The aforementioned decoding operation will best be appreciated by referring once again to the table illustrated in FIG. 2. Let it be assumed that the received code word is [00011]. This received code word is stored in latch circuit 704, and the respective bits which constitute this stored code word appear at output terminals $Q_4$-$Q_0$. The most significant bit of the stored word is a binary "0". Hence, the binary "0" at output $Q_4$ is supplied to each of exclusive-OR circuits 713–710. As a consequence thereof, the binary "0" provided at output terminal $Q_3$ passes through exclusive-OR circuit 713 substantially as is. Likewise, the binary "0" provided at output terminal $Q_2$ passes through exclusive-OR circuit 712 without inversion. Also, the binary "1"s provided at each of output terminals $Q_1$ and $Q_0$ pass through exclusive-OR circuits 711 and 710, respectively. Accordingly, the information word which is decoded by the illustrated decoding circuitry is represented as [0011] which, from FIG. 2, is the original information word that had been represented by the received CODE+ word.

If the received code word is [10111], then the most significant bit of this code word, as provided at output terminal $Q_4$ of latch circuit 704, is a binary "1". Thus, the remaining bits of the code word which appear at output terminals $Q_3$, $Q_2$, $Q_1$ and $Q_0$ all are inverted by operation of exclusive-OR circuits 713, 712, 711 and 710, respectively. Thus, the binary "0" provided at output terminal $Q_3$ is inverted by exclusive-OR circuit 713 to a binary "1". Also, the binary "1"s provided at output terminals $Q_2$, $Q_1$ and $Q_0$ are inverted by exclusive-OR circuits 712, 711 and 710, respectively, to binary "0"s. This means that the received code word is decoded to recover the original information word [1000]. Hence, the illustrated decoding circuitry functions to decode the CODE− word to its original information word.

From the foregoing, it should be appreciated that, if an n-bit information word is encoded as an m-bit code word, then latch circuit 704 must be capable of storing m bits, and n exclusive-OR circuits are used to recover the original n information bits from the stored m-bit code word.

Figure 7:
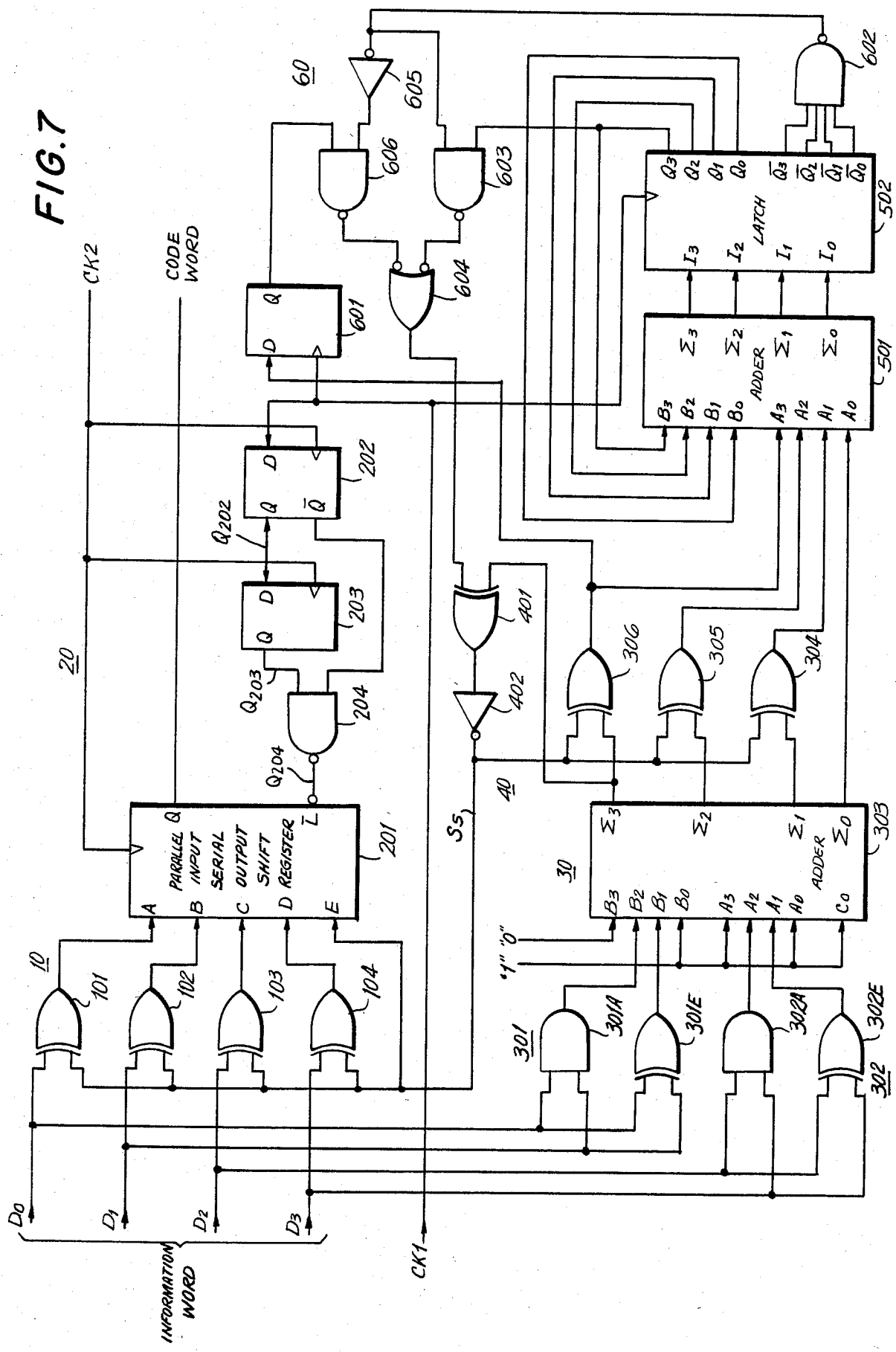
FIG. 7 is a logic diagram of another embodiment of an encoder.

Another embodiment of the present invention is illustrated in FIG. 7. This embodiment is similar to the embodiment discussed above with respect to FIG. 4, except that, in the FIG. 7 embodiment, a detector is provided to detect when the current DSV is equal to a predetermined value and, if so, to control the selection of the next-following code word to minimize undesired run-lengths and thus avoid any adverse affect on the self-clocking feature of the encoded word. As illustrated in FIG. 7, a NAND gate 602 is coupled to latch circuit 502 and is adapted to detect when the digital representation of the DSV stored in the latch circuit is equal to a predetermined value, such as [0000]. Preferably, latch circuit 502 includes complementary output terminals $\overline{Q}_3$, $\overline{Q}_2$, $\overline{Q}_1$ and $\overline{Q}_0$ whereat the complements of the digital representation provided at output terminals $Q_3$-$Q_0$ are produced. Thus, when the DSV stored in latch circuit 502 is equal to [0000], it is appreciated that a binary "0" is produced at each output terminal $Q_3$-$Q_0$, and a binary "1" is produced at each output terminal $\overline{Q}_3$-$\overline{Q}_0$. As an alternative, inverters may be coupled to each of output terminals $Q_3$-$Q_0$ to produce a complementary version of the DSV stored in the latch circuit. NAND gate 602 has its respective inputs connected to corresponding ones of complementary output terminals $\overline{Q}_3$-$\overline{Q}_0$ of latch circuit 502. As is conventional, when the digital representation [0000] is stored in the latch circuit, a binary "1" is supplied to each input of NAND gate 602, resulting in a binary "0" at the output thereof. Thus, NAND gate 602 detects when the DSV is equal to [0000].

The embodiment illustrated in FIG. 7 also includes a temporary storage circuit, such as a D-type flip-flop circuit 601. The D input of this flip-flop circuit is coupled to the output of exclusive-OR circuit 306 and is adapted to receive the most significant bit of the disparity which has been calculated for the immediately preceding code word. D-type flip-flop circuit 601 also includes a timing pulse input terminal coupled to receive the control clock pulse CK1 so as to be triggered to store the most significant bit of the disparity of the preceding code word when that code word is in the process of being shifted from shift register 201. It is appreciated that, when the updated DSV, as produced at the output terminals $\Sigma_0$-$\Sigma_3$, is stored in latch circuit 502, the most significant bit of the disparity which was used to update the DSV is stored in flip-flop circuit 601.

In the embodiment of FIG. 7, a gating circuit 60 is actuated by NAND gate 602 to supply the most significant bit of the disparity of the preceding code word, as stored in flip-flop circuit 601, to the comparator comprised of exclusive-OR circuit 401 whereat it is compared with the most significant bit of the calculated disparity for the preliminarily selected code word, as provided at the $\Sigma_3$ output terminal of full adder 303. More particularly, gating circuit 60 is comprised of an inverter 605 coupled to the output of NAND gate 602 to supply an inverted version of the output produced by this NAND gate to a respective input of NAND gate 606. NAND gate 606 has another input connected to the Q output of flip-flop circuit 601 to receive the stored most significant bit of the disparity of the preceding code word. The output of NAND gate 606 is coupled via an inverting OR gate 604 to one input of exclusive-OR circuit 401. As one of ordinary skill in the art appreciates, an inverting OR gate produces the binary "1" output whenever a binary "0" is supplied to any of its inputs. The inverting OR gate produces a binary "0" output only when a binary "1" is supplied to each input thereof. Thus, inverting OR gate 604 functions in the same manner as NAND gate 606. It is convenient, however, to represent inverting OR gate 604 as an OR-type circuit in order to emphasize its intended function. The other input of this inverting OR gate is coupled to the output of a NAND gate 603 whose inputs are connected to the output of NAND gate 602 and to output terminal $Q_3$ of latch circuit 502, respectively.

In operation, let it be assumed that the current DSV, as stored in latch circuit 502, is not equal to [0000]. Consequently, one or more of the bits provided at the complementary output terminals $\overline{Q}_0$-$\overline{Q}_3$ is a binary "0", thereby resulting in a binary "1" at the output of NAND gate 602. This binary "1" is inverted by inverter 605 to supply a binary "0" to NAND gate 606, thereby inhibiting the latter from responding to the most significant bit of the disparity of the preceding code word which may be stored in flip-flop circuit 601.

As a more specific example, it is assumed that the current DSV stored in latch circuit 502 is equal to +1, whose digital representation is [0001]. It is further assumed that the preceding information word was equal to [0010] and was represented by the CODE− word [11101] having a disparity of +3. It is appreciated that, when the code word [11101] was serially shifted from shift register 201, the most significant bit of the calculated disparity of this code word, as provided at the output of exclusive-OR circuit 306, was a binary "0". This binary "0" was stored in flip-flop circuit 601.

Now, let it be assumed that the next-following information word is equal to [1100]. It is recalled that the disparity of the CODE+ word which represents this information word is equal to −1. The digital representation of this disparity is [1111]. This digital representation is provided at output terminals $\Sigma_3$–$\Sigma_0$ of full adder 303.

Since the DSV stored in latch circuit 502 is equal to +1, NAND gate 602 produces a binary "1", as mentioned above. Consequently, NAND gate 606 is inhibited from supplying the binary "1" stored in flip-flop circuit 601 to exclusive-OR circuit 401. However, the binary "1" of NAND gate 602 conditions NAND gate 603 to supply the most significant bit (i. e. the sign bit) of the stored DSV to inverting OR gate 604. Since the stored DSV has been assumed to be equal to +1, which is digitally represented as [0001], the most significant bit thereof, as provided at output terminal $Q_3$ of latch circuit 502, is a binary "0". This binary "0" is supplied to conditioned NAND gate 603, whereat it is inverted and supplied as a binary "1" to inverting OR gate 604. The inverting OR gate serves to further invert this binary "1" to supply a binary "0" to exclusive-OR circuit 401. Thus, gate circuit 60 serves to couple the most significant bit of the stored DSV to exclusive-OR circuit 401 whereat it is compared to the most significant bit of the calculated disparity, as provided at output terminal $\Sigma_3$ of full adder 303. The calculated disparity is represented as [1111], whereby the most significant bit thereof differs from the most significant bit of the stored DSV. Hence, and as has been discussed above, selection signal generating circuit serves to produce a binary "0" selection signal. Accordingly, the CODE+ word [01100] is loaded into shift register 201. Also, the binary "1" most significant bit of the calculated disparity is supplied by exclusive-OR circuit 306 to flip-flop circuit 601 whereat it is stored.

Full adder 501 is supplied at its "A" inputs with the digital representation of −1, that is, with [1111]. The full adder is supplied at its "B" inputs with the digital representation of +1, that is, with [0001]. The full adder functions to add the disparity of the selected code word to the current DSV. As a result of this addition, the updated DSV is reduced to zero, that is, to [0000]. This updated DSV of [0000] is stored in latch circuit 502.

Let it now be assumed that the input information word is equal to [0011]. In the embodiment of FIG. 4, since the current disparity is equal to zero. The information word [0011], which may be represented either by CODE+ word [00011] or by CODE− word [11100], will be represented by the CODE+ word. It is recalled that the immediately preceding code was equal to [01100]. If the next-following code word is equal to [00011], it is appreciated that a significant run-length of binary "0"s will be present from the final two binary "0"s of the preceding code word followed by the first threee binary "0"s of the next-following code word. This run-length may adversely affect the self-clocking of the code word. Consequently, and in accordance with the embodiment shown in FIG. 7, rather than selecting the CODE+ word, the CODE− word now is selected.

More particularly, the current DSV of [0000] is detected by NAND gate 602. This NAND gate supplies a binary "0" to inhibit NAND gate 603, thus blocking the sign bit of the stored DSV from being compared in exclusive-OR circuit 401 to the sign bit of the calculated disparity. Moreover, inverter 605 inverts the binary "0" produced by NAND gate 602 to condition NAND gate 606. The binary "1" stored in flip-flop circuit 601 and representing the sign bit of the disparity of preceding code word [01100], whose disparity of −1 was equal to [1111], is inverted by conditioned NAND gate 606 and inverted once again by inverting OR gate 604 to be supplied as a binary "1" to one input of exclusive-OR circuit 401. The other input of this exclusive-OR circuit is supplied with the sign bit of the disparity which is calculated for the CODE+ word representing the information word [0011]. It is seen that this CODE+ word is equal to [00011] whose disparity is equal to −1, or [1111]. Therefore, exclusive-OR circuit 401 now is supplied with a binary "1" at each of its inputs. This means that the sign bit of the disparity of the code word now to be transmitted is equal to the sign bit of the disparity of the immediately preceding code word. In view of this comparison, exclusive-OR circuit 401 produces a binary "0" which is inverted by inverter 402 to produce a binary "1" selection signal $S_s$. Hence, rather than selecting the CODE+ word [00011], which would result in an undesirable run-length of binary "0"s from the preceding code word to the present code word, the CODE− word [11100] is selected to represent the information word [0011].

Since the CODE− word is selected, having a disparity of +1, the three most significant bits of the digital representation of this disparity all are inverted, thereby representing the proper disparity of the selected code word. This calculated disparity is summed with the current DSV so as to update the DSV from its value of zero to a value of +1. In addition, the sign bit of the calculated disparity, that is, the binary "0" most significant bit thereof, is stored in flip-flop circuit 601. Of course, since the updated DSV no longer is equal to zero, this stored sign bit will not be compared to the sign bit of the disparity which is calculated for the next-following code word.

Thus, in accordance with the embodiment shown in FIG. 7, in order to avoid undesired run-lengths, if the current DSV is equal to zero, then the code word which is selected to represent the next-following information word has a disparity of opposite polarity to the disparity of the immediately preceding code word. That is, if the immediately preceding code word was a CODE+ word, and if this CODE+ word resulted in a zero DSV, then the next-following information word is represented by a CODE− word. Conversely, if the immediately preceding information word was represented by a CODE− word, and if this CODE− word resulted in zero DSV, then the next-following information word will be represented by a CODE+ word. There are, of course, certain exceptions, as are apparent from the table of FIG. 2. For example, if the immediately preceding code word was a CODE+ word having a disparity of +1, then the next-following information word will be represented by another CODE+ word if the corresponding CODE− word has positive disparity. Thus, the embodiment shown in FIG. 7 serves to select a code word having disparity of opposite polarity to the disparity of the immediately preceding code word in the event that the current DSV is equal to zero. Of course, if the current DSV is not equal to zero, the embodiment shown in FIG. 7 operates in the very same manner as the embodiment discussed above with respect to FIG. 4.

Figure 8:
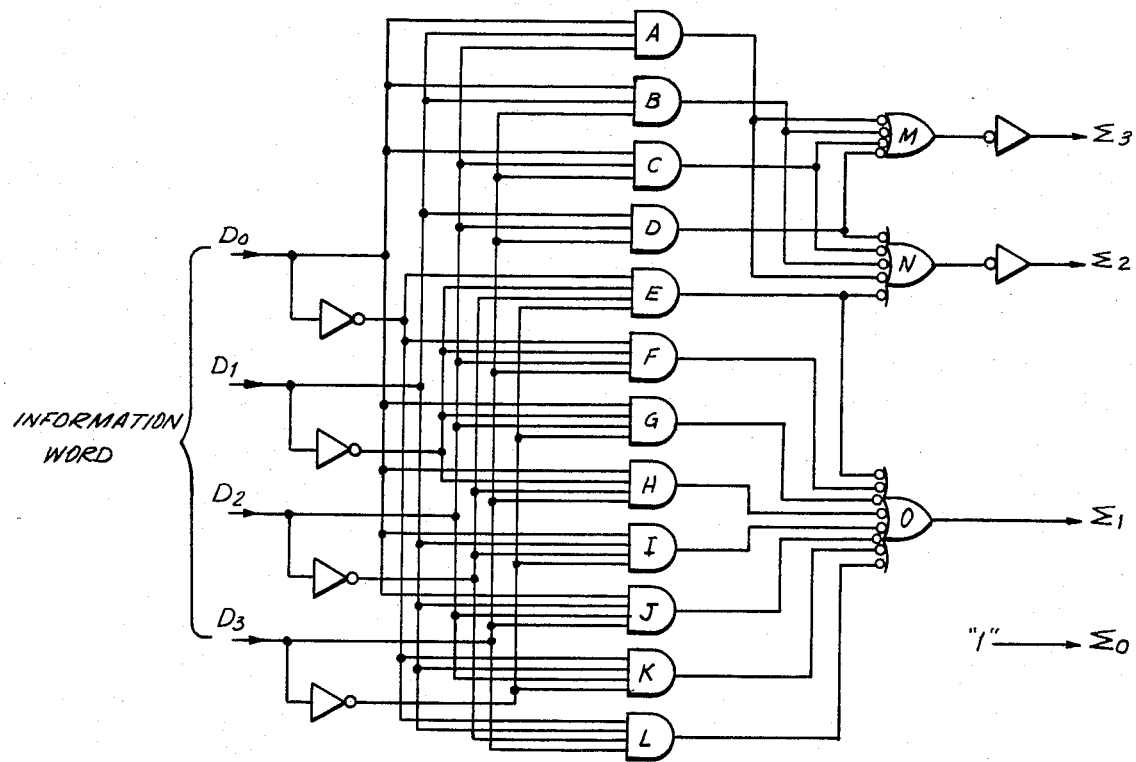
FIG. 8 is a logic diagram of an embodiment of a disparity calculating circuit which can be used with the present invention.

Referring now to FIG. 8, there is illustrated a logic diagram of another embodiment of disparity calculating circuit 30. This embodiment can be used in the encoding circuitry illustrated in either FIG. 4 or FIG. 7. The embodiment of FIG. 8 is comprised of a plurality of NAND gates A–L, each NAND gate being adapted to detect when the information word to-be-encoded is equal to one of a number of preselected information words. For example, NAND gate A is adapted to detect when the information word is equal to [X111], wherein "X" means that the most significant bit may be either a binary "0" or a binary "1". NAND gate B is adapted to detect when the information word is equal to [1X11]. The remaining NAND gates are connected in particular fashion so as to detect when the information word corresponds to one of a number of other preselected information words.

The outputs of NAND gates A–D are connected to respective inputs of an inverting OR gate M, the output of this inverting OR gate being inverted and used as the most significant bit, or sign bit, $\Sigma_3$ of the calculated disparity. Thus, inverting OR gate M may be thought of as being connected to one set of NAND gates.

NAND gates A–E are connected to respective inputs of an inverting OR gate N, the output of this inverting OR gate being further inverted and utilized as the next most significant bit $\Sigma_2$ in the calculated disparity. Hence, inverting OR gate N may be thought of as being connected to another set of NAND gates.

Finally, NAND gates E–L are connected to respective inputs of an inverting OR gate O, the output of this inverting OR gate being utilized as the next least significant $\Sigma_1$ in the calculated disparity. Thus, it is seen that each of inverting OR gates M, N and O, from which the respective bits $\Sigma_3$, $\Sigma_2$ and $\Sigma_1$ are derived for the digital representation of the calculated disparity, selectively produces a binary "1" or "0" for different sets of information words. For example, inverting OR gate M is responsive to the set of information words comprised of [111X], [11X1], [1X11], and [X111] to provide a binary "0" as the $\Sigma_3$ (or most significant) bit. Also, inverting OR gate N detects when the information word is included within the set comprised of the foregoing information words, together with the additional word [0000], resulting in a binary "0" as the $\Sigma_2$ bit of the calculated disparity. Finally, inverting OR gate O detects when the input information word is included within the set comprised of [0000], [0011], [0101], [0110], [1001], [1010], [1100] and [1111] to provide a binary "1" as the $\Sigma_1$ bit. Thus, the gating circuit illustrated in FIG. 8 calculates the disparity of each CODE+ word that is used to represent an input information word, in accordance with the table set out in FIG. 2.

Figure 9:
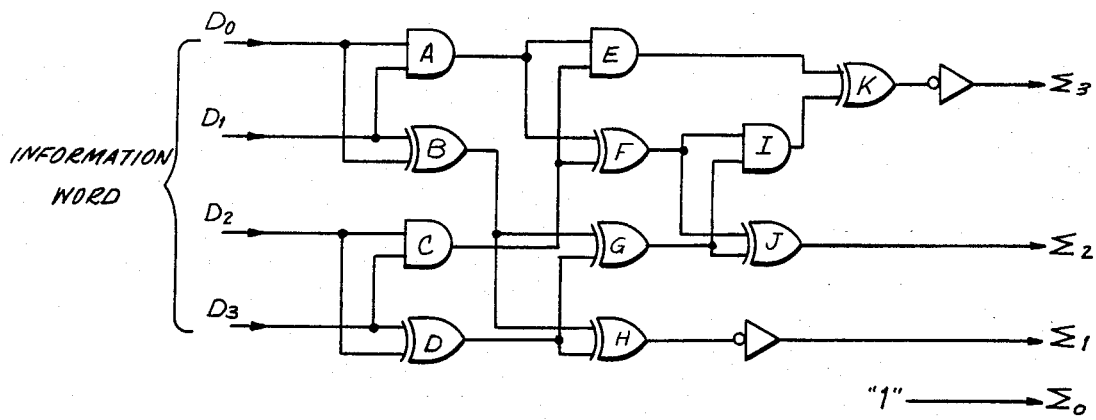
FIG. 9 is a logic diagram of another embodiment of a disparity calculating circuit.

FIG. 9 illustrates another embodiment of a gating circuit which carries out the same functions as those described above for the embodiment shown in FIG. 8 which can be used as disparity calculating circuit 30 in the encoding circuitry shown in FIG. 4. In the interest of brevity, a detailed description of the operation of the gating circuit shown in FIG. 9 is not provided. Nevertheless, one of ordinary skill in the art would appreciate that this gating circuit serves to produce a digital representation of the disparity for the CODE+ word which represents each input information word, as set out in the table of FIG. 2.

In the encoding circuitry described above with respect to the embodiments shown in FIGS. 4 and 7, which embodiments implement the table illustrated in FIG. 2, each CODE+ word is provided with a binary "0" sign bit, that is, the most significant bit of each CODE+ word is a binary "0", and the remaining bits are equal to the respective bits which constitute the input information word. Each CODE− word merely is the complement, or inverted version, of the CODE+ word which represents the same input information word. The advantages offered by the present invention are not limited solely to this particular encoding format. It is sufficient merely to represent each input information word with a code word having positive disparity and also with a code word having negative disparity. Although each information word may be represented by one of two different code words, each code word is representative of one and only one information word. In accordance with another embodiment of the present invention, each CODE+ word exhibits positive disparity and each CODE− word exhibits negative disparity. The table set out in FIG. 10 illustrates the respective CODE+ and CODE− words which are used to represent each information word, together with the respective disparity (and digital representation thereof) of each code word. The table of FIG. 10 differs from the table of FIG. 2 in that the most significant bit of the CODE+ word in FIG. 10 may be either a binary "1" or a binary "0", whereas the most significant bit of each CODE+ word in FIG. 2 is constrained to be a binary "0". Hence, in FIG. 10, the disparity of each CODE+ word is positive; whereas in FIG. 2, the disparity of each CODE+ word may be either positive or negative, depending upon the particular bit configuration of the code word. Similarly, each CODE− word in FIG. 10 exhibits only negative disparity, and the most significant bit of the CODE− words may be either binary "0" or binary "1"; whereas in FIG. 2, each CODE− word has a binary "1" as its most significant bit, and some CODE− words exhibit negative disparity.

Figure 11:
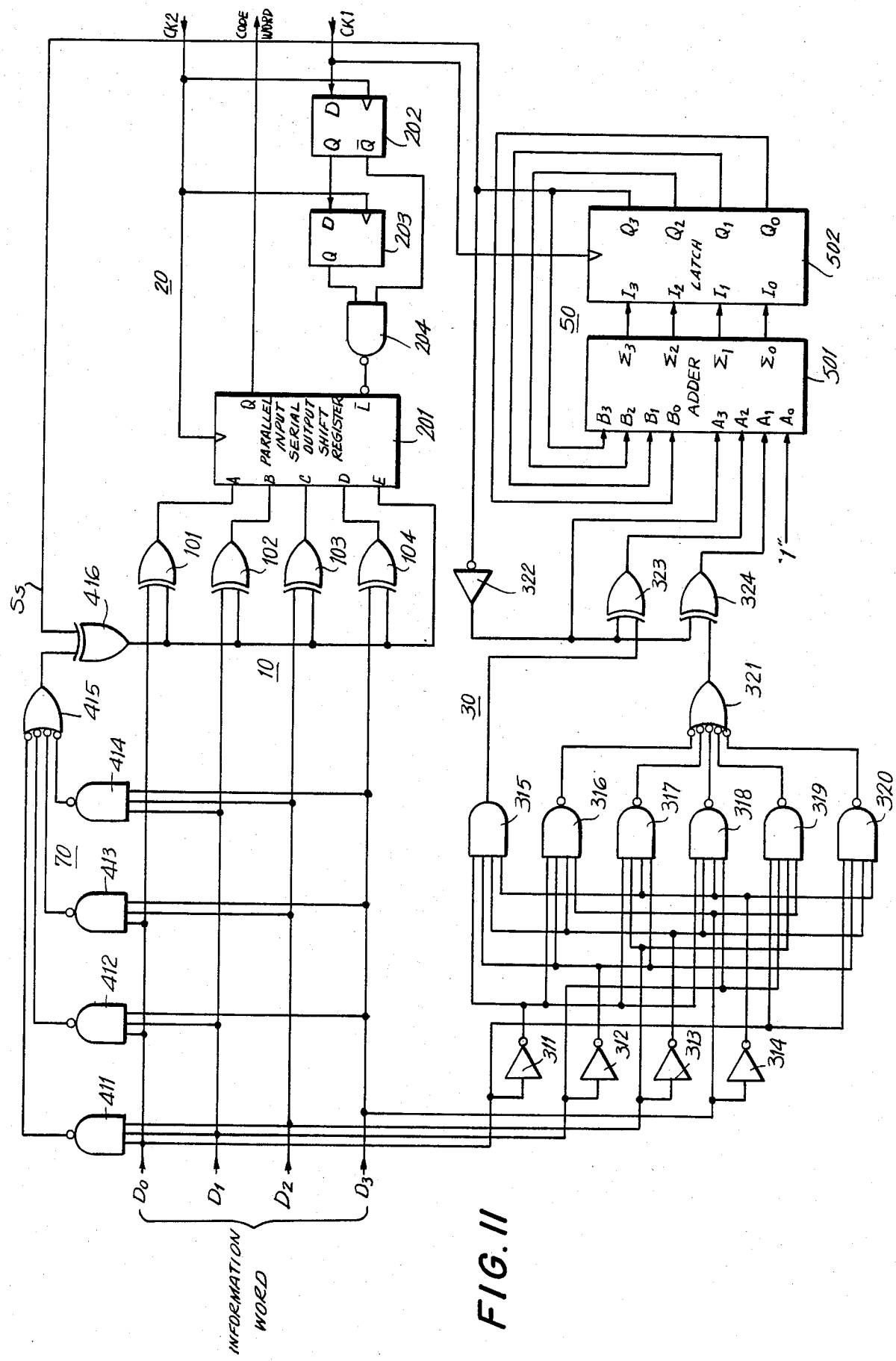
FIG. 11 is a logic diagram of yet another embodiment of the present invention.

An embodiment of encoding circuitry for encoding an input information word to a code word in accordance with the table of FIG. 10 is illustrated in FIG. 11. The underlying theory of operation of this embodiment is similar to that described above, that is, the input information word is converted to a code word whose disparity, when combined with the current DSV, tends to reduce the DSV towards zero. More particularly, if the current DSV is positive, then a CODE− word is selected to represent the input information word because the negative disparity of that CODE− word tends to reduce the DSV towards zero. Conversely, if the current DSV is negative, then the CODE+ word is selected to represent the input information word because the disparity of that CODE+ word is positive which will reduce the DSV towards zero.

The embodiment of FIG. 11 is comprised of a code converting circuit 10 and a parallel-to-serial converter 20 which are similar to the code converting circuit and parallel-to-serial converter discussed above with respect to FIG. 4. The encoding circuitry also includes a DSV determining circuit 50 which is similar to the aforedescribed DSV determining circuit. The differences between the embodiments of FIGS. 11 and 4 is that, in the embodiment of FIG. 11, a different disparity calculating circuit 30 is provided and, in addition, a sensing circuit 70 is provided to sense if the input information word corresponds to one of a preselected number of information words and, if so, to control the operation of code converting circuit 10 accordingly.

Disparity calculating circuit 30 is comprised of an AND gate 315 and NAND gates 316–320, each gate being adapted to detect if the input information word is included within predetermined sets. More particularly, AND gate 315 is adapted to detect if the input information word is equal to [0000], and the inputs thereof are coupled, via inverters 311, 312, 313 and 314 to receive bits $D_0$, $D_1$, $D_2$ and $D_3$, respectively, of the information word. If each of these bits is a binary "0", the respective inverters supply AND gate 315 with a binary "1" at each input thereof, whereupon the AND gate produces a binary "1" indicating that the input information word is [0000]. NAND gates 316–320 are selectively supplied with inverted and non-inverted bits of the information word such that each NAND gate may detect if the information word corresponds to an associated, predetermined word. Thus, in the illustrated configuration, NAND gate 316 detects if the information word is [1000]; NAND gate 317 detects if the information word is [0100]; NAND gate 318 detects if the information word is [0010]; NAND gate 319 detects if the information word is [1111]; and NAND gate 320 detects if the information word is [0001]. These NAND gates are coupled to respective inputs of an inverting OR gate 321 such that the inverting OR gate produces a binary "1" if the input information word is equal to one of the five predetermined words which are detected by these NAND gates.

The output of AND gate 315 is coupled to a respective input of an exclusive-OR circuit 323; and the output of inverting OR gate 321 is coupled to a respective input of an exclusive-OR circuit 324. The remaining inputs of exclusive-OR circuits 323 and 324 are connected in common to receive an inverted version of the most significant bit of the digital representation of the current DSV stored in latch circuit 502. This most significant bit, which represents the sign, or polarity, of the current DSV, that is, the DSV which has been determined for the preceding code words, is provided at output terminal $Q_3$ of the latch circuit and is coupled, via an inverter 322, to the common-connected inputs of the exclusive-OR circuits. The outputs of inverter 322, exclusive-OR circuit 323 and exclusive-OR circuit 324 correspond to the three most significant bits of the calculated disparity of the code word which is used to represent the input information word. The least significant bit of the disparity is a binary "1", thus representing that the disparity is an odd positive or negative number. This 4-bit representation of the calculated disparity is supplied to the "A" inputs of full adder 501. The digital representation of the current DSV is supplied to the "B" inputs of this full adder, as in the aforedescribed embodiments. As discussed above, full adder 501 sums the the disparity and the current DSV to produce a digital representation of the updated DSV, this updated DSV being stored in latch circuit 502 when the code word is serially shifted from shift register 201.

Sensing circuit 70 is adapted to sense if the input information word includes three or more binary "1"s. Accordingly, the sensing circuit is comprised of NAND gates 411, 412, 413 and 414, each NAND gate having three inputs connected to receive respective ones of the information word bits. More particularly, NAND gate 411 is adapted to sense if the input information word is [0111], NAND gate 412 is adapted to sense if the information word is [1011], NAND gate 413 is adapted to sense if the information word is [1101] and NAND gate 414 is adapted to sense if the information word is [1110]. All of these NAND gates are operable to sense if the information word is [1111]. The outputs of NAND gates 411–414 are connected to respective inputs of an inverting OR gate 415. Thus, the inverting OR gate 415 produces a binary "1" when any of the aforementioned predetermined information words (i.e. an information word containing three binary "1"s) is received. The output of this inverting-OR gate is compared to the most significant bit (i. e. the sign bit) of the current DSV stored in latch circuit 502 by an exclusive-OR circuit 416. The output of exclusive-OR circuit 416 is used as the most significant bit of the code word and, moreover, if this output is a binary "1", the remaining four bits of the code word are inverted versions of the input information word. However, if the output of exclusive-OR circuit 416 is a binary "0", then the remaining four bits of the code word correspond to the information word, as is.

In the interest of brevity, only the operation of disparity calculating circuit 30 and sensing circuit 70 will be described. It is recalled that if the current DSV is positive, then the code word which is selected to represent the next-following information word must exhibit negative disparity. Thus, if the sign bit of the stored DSV is a binary "0", the sign bit of the digital representation of disparity must be a binary "1". Conversely, if the current DSV is negative, as represented by a binary "1" sign bit, then the disparity of the code word which is selected to represent the next-following information word must be positive, that is, the most significant bit of the disparity of that code word must be a binary "0". Inverter 322 carries out this operation. If the sign bit of the calculated disparity is a binary "0", then, from the table set out in FIG. 10, it is seen that the next most significant bit of the disparity is a binary "1" only if the information word is [0000]. For all other information words, the next most significant bit of the calculated disparity is a binary "0". Conversely, if the sign bit of the disparity is a binary "1", then the next most significant bit is a binary "0" only if the information word is [0000]. For all other information words, the next most significant bit is a binary "1". AND gate 315 detects if the information word is [0000] to produce a binary "1", and exclusive-OR circuit 323 passes this binary "1" if the sign bit of the disparity is a binary "0", and inverts this binary "1" if the sign bit is a binary "1". AND gate 315 produces a binary "0" for all other information words, and this binary "0" is passed by exclusive-OR circuit 323 if the sign bit of the disparity is a binary "0", and is inverted if the sign bit of the disparity is a binary "1".

From the table set out in FIG. 10, it is seen that inverting OR gate 321 produces a binary "1" only if the information word is [0001], [0010], [0100], [1000], and [1111]. The inverting OR gate produces a binary "0" in response to all other information words. If the sign bit of the current DSV is a binary "0", then the binary "1" or "0" produced by inverting OR gate 321 is passed, as is, by exclusive-OR circuit 324. However, if the sign bit of the DSV is a binary "1", then the output of inverting OR gate 321 is inverted by exclusive-OR circuit 324.

Thus, depending upon the state of the sign bit of the current DSV, the calculated disparity is determined by the particular bit configuration of the input information word, in accordance with the table set out in FIG. 10. The calculated disparity then is summed with the current DSV to update the DSV for use in encoding the next-following information word.

Sensing circuit 70 cooperates with code converting circuit 10 to produce a CODE− word whose most significant bit is a binary "0", and which exhibits negative disparity, if the current DSV is positive, except for five separate conditions of the input information word. In the presence of one of these five conditions, the most significant bit of the CODE− word is changed over to a binary "1". Similarly, sensing circuit 70 controls code converting circuit 10 to produce a CODE+ word, having positive disparity, whose most significant bit is a binary "1" if the current DSV is negative, except for those same five conditions. Upon the occurrence of one of those conditions, the most significant bit of the CODE+ word is a binary "0". As mentioned above, these five conditions are represented by five separate information words, each of which contains at least three binary "1"s.

In the absence of any of these five conditions, inverting OR gate 415 supplies a binary "0" to exclusive-OR circuit 416. If the sign bit of the current DSV stored in latch circuit 502 is a binary "0", thus representing a positive DSV, this binary "0" is supplied by exclusive-OR circuit 416 as the most significant bit of the code word and, moreover, conditions the exclusive-OR circuits of code converting circuit 10 to pass the 4-bit information word, as is. From the table set out in FIG. 10, it is seen that if the most significant bit of the code word is a binary "0", then, in the absence of any of the aforementioned five conditions, the remaining four bits of the code word are constituted by the information word. Of course, such code words are CODE− words having negative disparity. Now, if one of the aforementioned five conditions is present, then inverting OR gate 415 supplies a binary "1" to exclusive-OR circuit 416, thereby inverting the binary "0" sign bit of the DSV. This inverted sign bit is utilized as a binary "1" most significant bit of the code word. Furthermore, the remaining four bits of the code word are complements, or inverted versions of the respective bits of the information word. Nevertheless, each of these code words is a CODE− word having negative disparity.

In similar manner, if the current DSV, as stored in latch circuit 502 is negative, its sign bit is a binary "1" and is supplied to exclusive-OR circuit 416. In the absence of any of the aforementioned five conditions, inverting OR gate 415 supplies a binary "0" to the other input of exclusive-OR circuit 416. Hence, this exclusive-OR circuit produces a binary "1" which is used as the most significant bit of the code word and, moreover, it is used to invert the respective bits of the information word. Consequently, when the current DSV is negative, in the absence of any of the aforementioned five conditions, exclusive-OR circuit 416 produces a binary "1" which is used as the most significant bit of the code word and also conditions code converting circuit 10 to invert the respective bits of the information word, thus resulting in the CODE+ words illustrated in FIG. 10. However, if the information word contains at least three binary "1"s, inverting OR gate 415 supplies exclusive-OR circuit 416 with a binary "1". Hence, even though the current DSV is negative, exclusive-OR circuit 416 produces a binary "0" which is used as the most significant bit of the code word. Furthermore, exclusive-OR circuits 101–104 pass the respective bits of the information word as is. Nevertheless, code converting circuit 10 produces CODE+ words having positive disparity, as indicated in the table of FIG. 10.

It is appreciated that shift register 201 functions to convert the parallel-bit code words supplied thereto by code converting circuit 10 into successive serial-bit code words.

If desired, the embodiment in FIG. 11 may be supplemented with gating circuit 60, described above with respect to FIG. 7, or a modification of that gating circuit so as to prevent undesired run-lengths.

Figure 12:
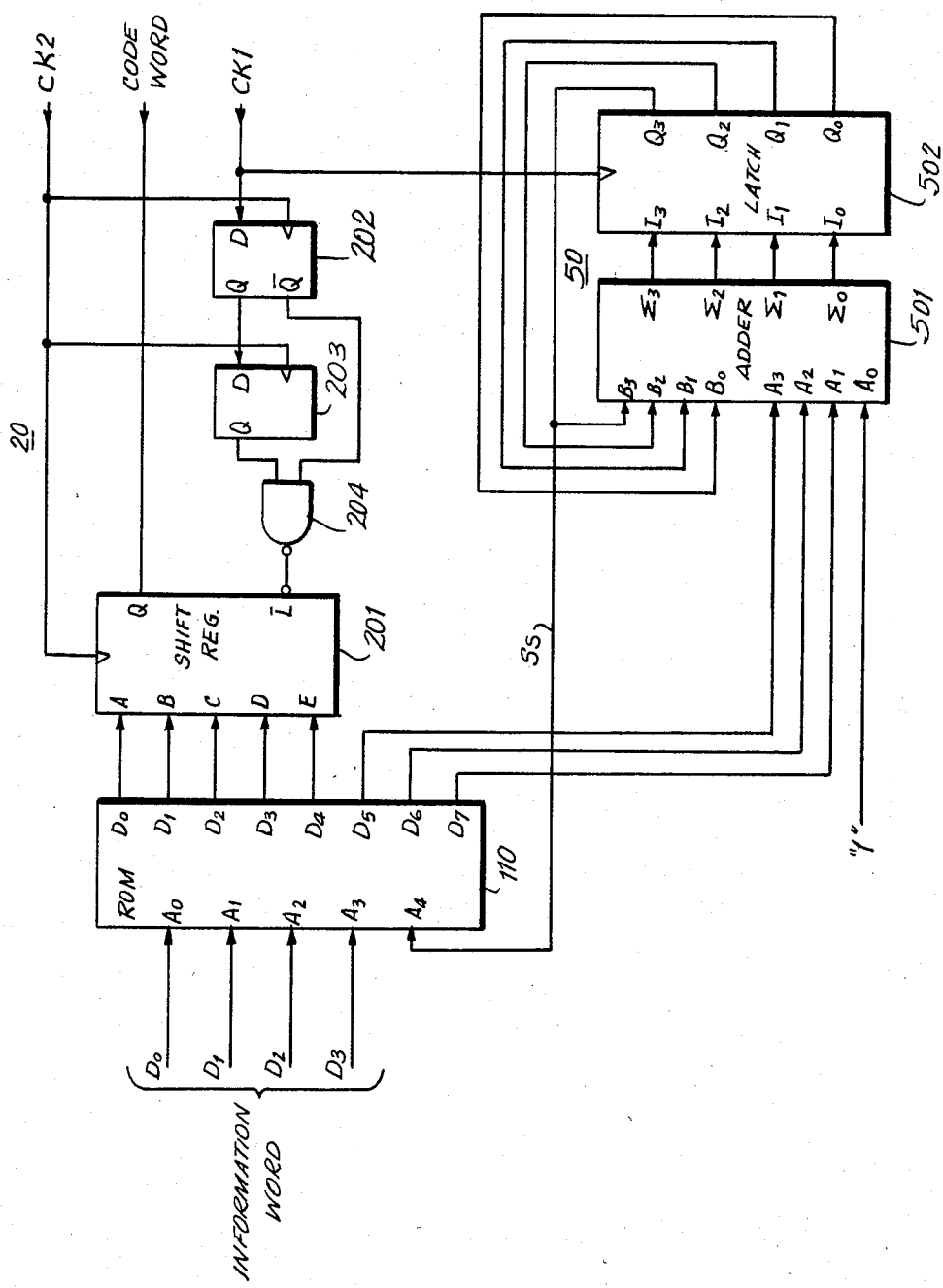
FIG. 12 is a logic diagram of a still further embodiment of the present invention.

Yet another embodiment of the present invention is illustrated in FIG. 12. In this embodiment, a read only memory (such as a convention ROM) may be used to carry out the aforedescribed functions of code converting circuit 10 and disparity calculating circuit 30 in the embodiments of FIGS. 4 and 7. ROM 110 also may be used to carry out the aforedescribed operations of sensing circuit 70 in the embodiment of FIG. 11. The encoding circuitry of FIG. 12 also includes parallel-to-serial converter 20 and DSV determining circuit 50, both of which have been discussed above.

ROM 110 is provided with, for example, thirty-two addressable locations, each location having stored therein an 8-bit word, comprised of bits $D_0$–$D_7$, with bits $D_0$–$D_4$ comprising the 5-bit code word, and with bits $D_5$–$D_7$ comprising the three most significant bits of the digital representation of disparity. Each location is addressed by a 5-bit address word supplied to address input terminals $A_0$–$A_4$. The most significant bit of the address word is the sign bit of the DSV and, as illustrated herein, output terminal $Q_3$ of latch circuit 502 is coupled to input terminal $A_4$ of ROM 110. The remaining four bits of the address word are comprised of the 4-bit information word $[D_3 D_2 D_1 D_0]$.

If the embodiment shown in FIG. 12 is utilized to implement the table illustrated in FIG. 10, then, whenever the sign bit of the current DSV is a binary "0", representing a positive DSV, those locations in ROM 110 whereat the CODE− words are stored are addressed, the particular address being determined by the information word. Conversely, if the sign bit of the current DSV is a binary "1", thereby representing a negative DSV, those locations whereat the CODE+ words are stored are addressed; the particular location being determined by the bit configuration of the information word. Thus, it is seen that the particular code word which is read out of the address location of ROM 110 is the proper representation of the information word which has been received, and is selected as a function of the polarity of the current DSV. In addition, the very same location from which the selected code word is read also stores three of the four bits representing the disparity of that code word. These three bits also are read out from the addressed location of ROM 110 and, together with a binary "1", are supplied to the "A" input of full adder 501.

Of course, if a read only memory device is used, any other encoding format may be adopted, as desired, whereby the particular code word which is used to represent the input information word has a disparity which tends to reduce the current DSV towards zero.

Figure 13:
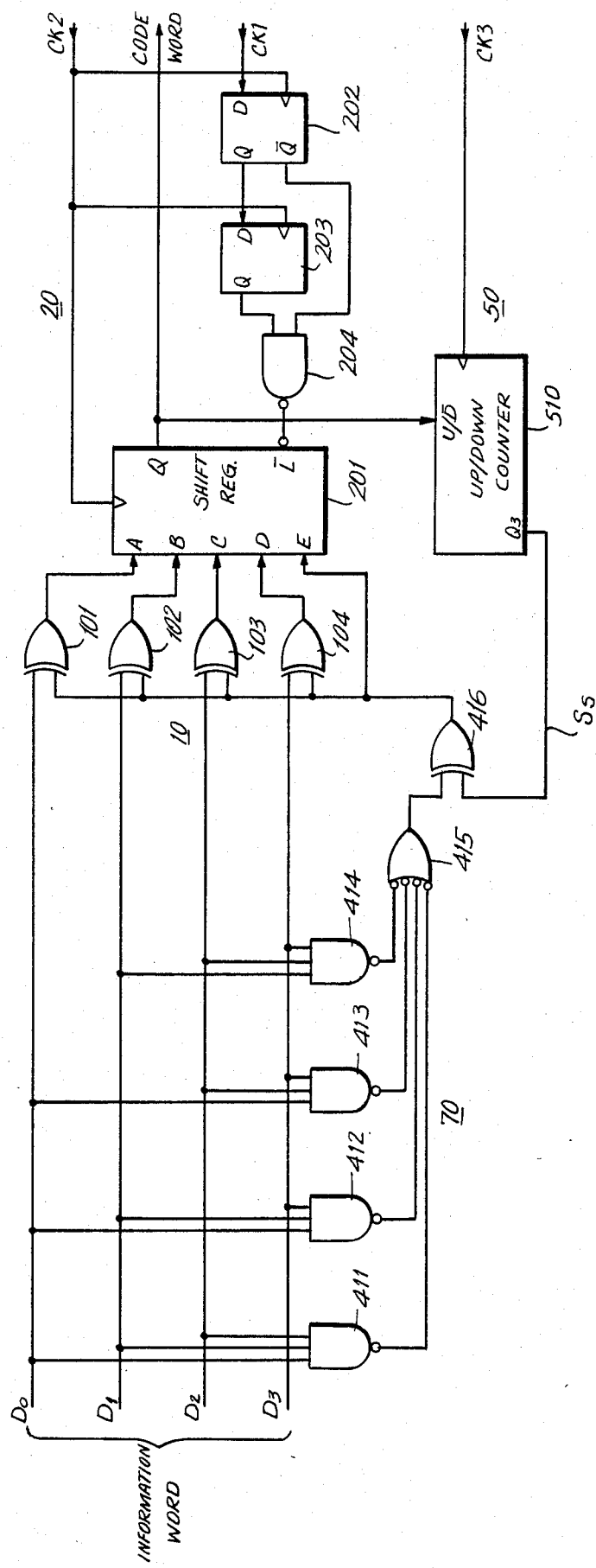
FIG. 13 is a logic diagram of yet another embodiment of the present invention.

Yet another embodiment of the present invention is illustrated in FIG. 13. This embodiment is similar to the aforedescribed embodiment of FIG. 11, except that a modified DSV determining circuit 50 is provided and, consistent with this modified DSV determining circuit, disparity calculating circuit 30 is omitted. The embodiment of FIG. 13 thus includes code converting circuit 10, parallel-to-serial converter 20, DSV determining circuit 50 and sensing circuit 70.

DSV determining circuit 50 is comprised of an up/down counter 510 having a timing pulse input terminal connected to receive timing pulses CK3, and a count-direction control terminal coupled to the Q output of shift register 201 to receive each successive bit which is shifted from that register. Up/down counter 510 preferably is a 4-bit counter, and an output $Q_3$ is provided for the most significant bit of the accumulated count.

Counter 510 functions to "integrate" the binary "1"s of the code words which are successively and serially shifted out of shift register 201. Thus, the instantaneous count present in counter 510 at any given time represents the DSV of the previously transmitted code words. More particularly, a binary "1" supplied from the Q output of shift register 201 to the count direction control terminal of counter 510 enables the count therein to be incremented in response to each timing pulse CK3. A binary "0" supplied to the count direction control terminal enables the count to be decremented in response to each timing pulse. Timing pulses CK3 are inverted versions of aforedescribed clock pulses CK2, and each timing pulse CK3 is synchronized with a transmitted bit of the code word. Thus, after a bit is shifted out of shift register 201, the count of up/down counter 510 either is incremented (if that shifted bit was a binary "1") or is decremented (if that bit was a binary "0"). After a complete code word has been shifted out of shift register 201, the most significant bit of the count then present in up/down counter 510 represents the polarity of the DSV, that is, this most significant bit represents whether the DSV is positive or negative.

As in the aforedescribed embodiment of FIG. 11, this sign bit provided at the $Q_3$ output of up/down counter 510, which is similar to the sign bit provided at the $Q_3$ output of latch circuit 502, is applied to exclusive-OR circuit 416 to control the operation of code converting circuit 10 in the aforedescribed manner.

Figure 14:
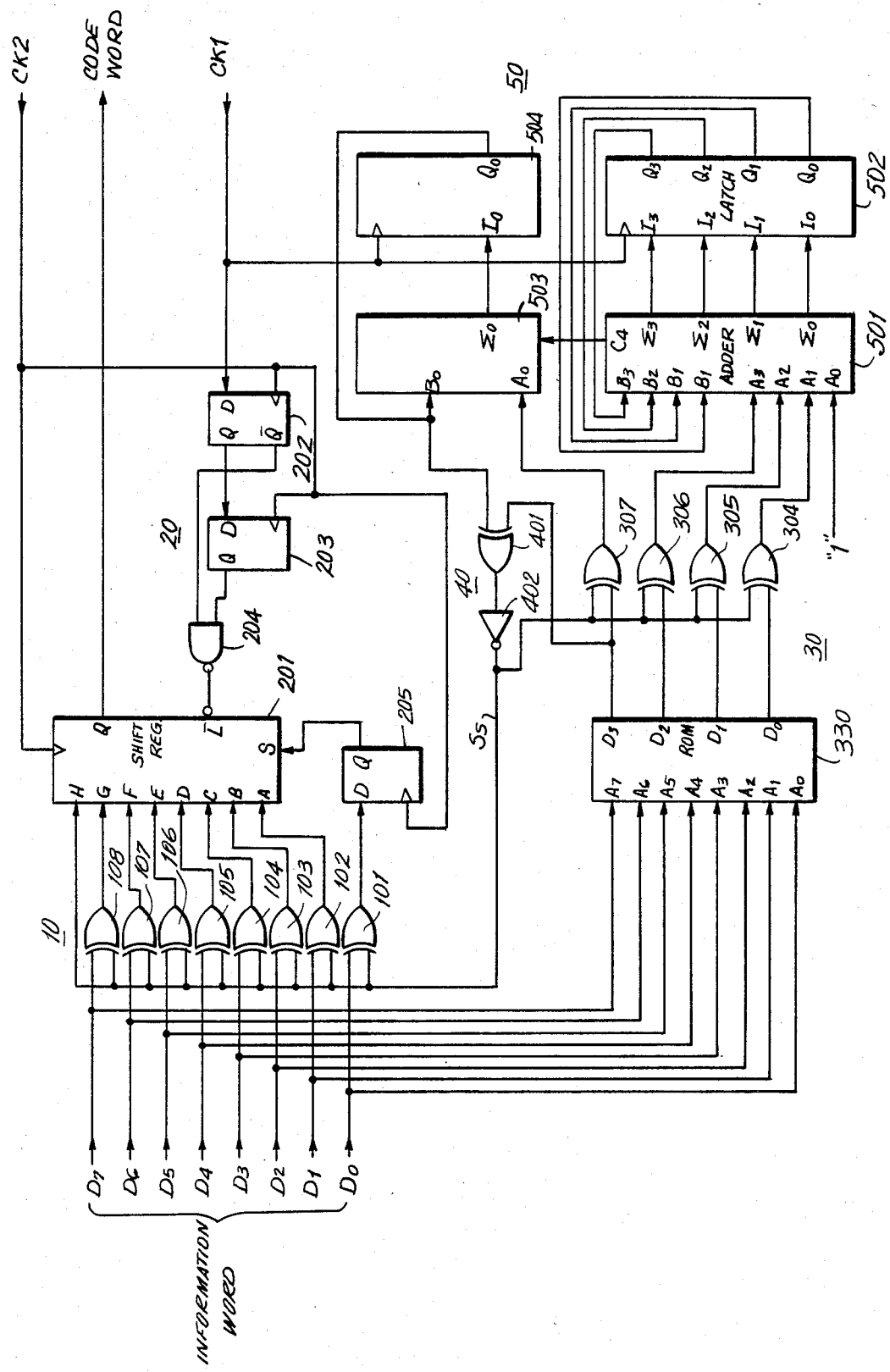
FIG. 14 is a logic diagram of an additional embodiment of the present invention.

In the embodiments which have been discussed hereinabove, it has been assumed that the information word is comprised of four bits (n=4) and that the code word which is used to represent that 4-bit information word is comprised of five bits (m=5). It is recognized that the present invention is applicable to information and code words which are comprised of a greater number of bits. Since this invention is intended to be used in a digital VTR, each information word preferably is comprised of eight bits (n=8) to represent the sampled video signal. FIG. 14 illustrates yet another embodiment of the present invention wherein an 8-bit information word is encoded into a 9-bit (m=9) code word. This embodiment proceeds under the same theory of operation as the embodiment discussed above with respect to FIG. 4 and is comprised of a code converting circuit 10, a parallel-to-serial converter 20, a disparity calculating circuit 30, a selection signal generating circuit 40 and a DSV determining circuit 50. Code converting circuit 10 includes exclusive-OR circuits 101–108 which are similar to aforedescribed exclusive-OR circuits 101–104. Each exclusive-OR circuit includes a respective input connected to receive a corresponding one of bits $D_0$–$D_7$ of the 8-bit information word. The outputs of the exclusive-OR circuits are supplied to a parallel-input/serial-output shift register which, in the illustrated embodiment, is comprised of shift register 201 taken in conjunction with D-type flip-flop circuit 205. In addition to the eight bits supplied by exclusive-OR circuits 101–108, which eight bits constitute the eight bits of lesser significance of the 9-bit code word, selection signal $S_s$, which is generated in a manner similar to the generation of selection signal $S_s$ in FIG. 4, is supplied as the most significant bit to the shift register. Conventionally, most parallel-input/serial-output shift registers are provided with eight separate input terminals. Thus, to serialize a 9-bit code word, D-type flip-flop circuit 205 is provided to receive the least significant bit of this code word and, when shift register 201 is actuated to shift out the bits stored therein, this least significant bit is shifted from flip-flop circuit 205 to shift register 201 and thence through the respective stages of the latter until it arrives at output terminal Q. Of course, if a 9-bit parallel-input/serial-output shift register is provided, flip-flop circuit 205 may be omitted, and all nine bits of the code word may be supplied, in parallel, to such a shift register. The control over shift register 201 by flip-flop circuits 202 and 203 and NAND gate 204 is substantially identical to that described above with respect to FIG. 4. Hence, in the interest of brevity, further description of such control is not provided.

A table representing the respective CODE+ and CODE− words which may be selected to represent each 8-bit information word, together with the disparity of such code words, is illustrated in FIG. 15. It is appreciated that the maximum disparity of a 9-bit code word is ±9. That is, if the code word is comprised of all binary "1"s or all binary "0"s, the disparity thereof is equal to nine. Consequently, the digital representation of such disparity requires the use of five bits. The least significant bit of the digital representation of disparity is a binary "1" because, since each code word is comprised of an odd number of bits, the disparity thereof always will be odd.

Disparity calculating circuit 30 used in the embodiment of FIG. 14 preferably is a read only memory (ROM) 330 having 256 addressable locations therein. The 8-bit information word $D_0$–$D_7$ is utilized as an 8-bit address word to read out the four most significant bits of the 5-bit digital representation of disparity for each CODE+ word that can be used to represent the respective information words. Depending upon the logic condition of selection signal $S_s$, these four most significant bits either are used, as is, to represent the disparity of a CODE+ word, or such bits are inverted to represent the disparity of a CODE− word. Exclusive-OR circuits 304–307 selectively pass or invert the four most significant bits of the digital representation of disparity which are read from ROM 330. As illustrated, exclusive-OR circuits 304–307 are provided with first inputs connected to output terminals $D_0$–$D_3$, respectively, of ROM 330, and with second inputs connected in common to receive selection signal $S_s$. If the selection signal is a binary "0", then the exclusive-OR circuits pass the four most significant bits of the digital representation of disparity, as is. However, if the selection signal is a binary "1", then these four most significant bits are inverted. The digital representation of disparity is supplied to the "A" inputs of a full adder comprised of a first stage 501 and a second stage 503. The digital representation of current DSV is supplied to the "B" inputs of this full adder. In addition, and as was described in the embodiment of FIG. 4, the most significant bit read out of ROM 330 is compared, by exclusive-OR circuit 401 to the most significant bit, or sign bit, of the DSV.

Most conventional full adder circuits are capable of summing two 4-bit words supplied thereto. In the embodiment shown in FIG. 14, both the disparity and the DSV are represented by 5-bit words. To provide "full addition" of such 5-bit words, it is necessary to provide two 4-bit full adder stages 501 and 503. Of course, in stage 503, only the most significant bits of the disparity and DSV are summed. To insure proper summation of such most significant bits in stage 503, a "carry bit" is supplied to a carry input terminal of stage 503 from carry output terminal $C_4$ of stage 501.

The summation of the 5-bit disparity and DSV words is represented by a 5-bit updated DSV provided at output terminals $\Sigma_0 - \Sigma_3$ of stage 501 and output terminal $\Sigma_0$ of stage 503. The bit provided by stage 503 is the most significant bit of the updated DSV, and the remaining four bits of lesser significance are provided at output terminals $\Sigma_0 - \Sigma_3$ of stage 501. This 5-bit representation of the updated DSV is stored in a latch circuit comprised of stages 502 and 504. Stage 502 is a 4-bit latch circuit adapted to store the four bits of lesser significance of the updated DSV, and stage 504 is adapted to store the most significant bit, or sign bit, of the updated DSV. Alternatively, stages 502 and 504 may be integrated into a single 5-bit (or greater) latch circuit.

In operation, let it be assumed that the current DSV, as represented by the digital representation stored in latch circuits 502 and 504, is equal to +5, or [00101]. Let it also be assumed that the input information word is [00000111]. This information word is used as an address to read out from ROM 330 the four most significant bits of the disparity of the CODE+ word corresponding to this information word. From the table set out in FIG. 15, it is appreciated that ROM 330 is addressed to read out [1110]. The most significant bit, which is read out from output terminal $D_3$ of the ROM, is compared, in exclusive-OR circuit 401, to the sign bit of the current DSV. This sign bit is a binary "0", and the most significant bit read out from ROM 330 is a binary "1". Hence, exclusive-OR circuit 401 produces a binary "1" which is inverted by inverter 402 to a binary "0" selection signal $S_s$. This binary "0" is utilized as the most significant bit of the 9-bit code word and, moreover, enables exclusive-OR circuits 101–108 to pass the input information word, as is, so as to comprise the remaining bits of the code word. Hence, the code word which is loaded into the parallel-to-serial converter and which then is serially shifted out therefrom is [000000111].

As mentioned above, the four most significant bits read out from ROM 330 are [1110]. These bits are supplied to exclusive-OR circuits 304–307 which, in response to the binary "0" selection signal $S_s$, pass these bits as is. Accordingly, the digital representation of disparity for the transmitted code word is [11101], the least significant bit being constituted by the binary "1" which always is present in this embodiment. From the table of FIG. 15, it is recognized that the disparity of the transmitted code word is equal to −3. The full adder comprised of stages 501 and 503 adds this disparity to the current DSV, resulting in an updated DSV of +2, or [00010].

Let it now be assumed that the next-following information word is representated as [00000101]. This information word is supplied as an address to ROM 330 to read out the four most significant bits of the disparity for the CODE+ word which may be used to represent this information word. From the table illustrated in FIG. 15, it is seen that the four most significant bits which are read out of the ROM are represented as [1101]. As before, the most significant bit of the disparity is compared to the sign bit of the current DSV. Since the current DSV is equal to +2, the binary "0" sign bit thereof is compared, in exclusive-OR circuit 401, to the binary "1" which is read out from output terminal $D_3$ of ROM 330. Exclusive-OR circuit 401 produces a binary "1" which is inverted by inverter 402 to provide a binary "0" selection signal $S_s$. This selection signal is utilized as the most significant bit of the code word and, moreover, it enables exclusive-OR circuits 101–108 to pass the input information word, as is. Thus, the code word which is loaded into the parallel-to-serial converter is represented as [000000101].

Since the selection signal $S_s$ is a binary "0", the four most significant bits of the disparity, as read out of ROM 330, are passed, as is, by exclusive-OR circuits 304–307. These four bits are combined with the binary "1" least significant bit resulting in a digital representation of the disparity as [11011]. From the table set out in FIG. 15, it is appreciated that this disparity is equal to −5.

The disparity of −5 is summed with the DSV of +2 in the full adder, resulting in an updated DSV of −3, or [11101], which is stored in the latch circuit.

Let it now be assumed that the next-following information word is [00001100]. From the table shown in FIG. 15, it is seen that this information word addresses ROM 330 to read out the four most significant bits of the disparity of the corresponding CODE+ word. These four most significant bits are [1101]. As before, the most significant of these bits is supplied from output terminal $D_3$ to one input of exclusive-OR circuit 401 whereat it is compared with the sign bit of the current DSV stored in the latch circuit. The current DSV is equal to −3, whose sign bit is a binary "1". Thus, exclusive-OR circuit 401 is supplied with a binary "1" at each input thereof, thereby producing a binary "0" which is inverted by inverter 402 to a binary "1" selection signal $S_s$. This binary "1" selection signal is utilized as the most significant bit of the 9-bit code word and, moreover, conditions exclusive-OR circuits 101–108 to invert the bits of the input information word. Hence, the information word now is represented by its corresponding CODE− word [111110011].

The binary "1" selection signal $S_s$ also conditions exclusive-OR circuits 304–307 to invert the bits which are read out of ROM 330 so as to provide a proper digital representation of the disparity of the CODE− which is transmitted. Accordingly, the exclusive-OR circuits provide the four most significant bits of [0010], and the least significant bit is, of course, a binary "1". Hence, the digital representation of the disparity of the CODE− word is seen to be [00101]. This disparity, which is equal to +5, is summed with the current DSV of −3 so as to update the DSV. The full adder thus supplies the latch circuit with the digital representation [00010]. The illustrated embodiment thus is prepared to encode the next-following information word.

From the foregoing detailed description, it is appreciated that the embodiment shown in FIG. 14 encodes an 8-bit information word into a 9-bit code word whose disparity is such that the current DSV is reduced towards zero. That is, if the DSV of the preceding code words is positive, the code word which is selected to represent the input information word exhibits a negative disparity. Conversely, if the current DSV is negative, the code word which is selected to represent the input information word exhibits a positive disparity. Furthermore, the absolute maximum level which the DSV may attain is seen to be ±9.

Figure 16:
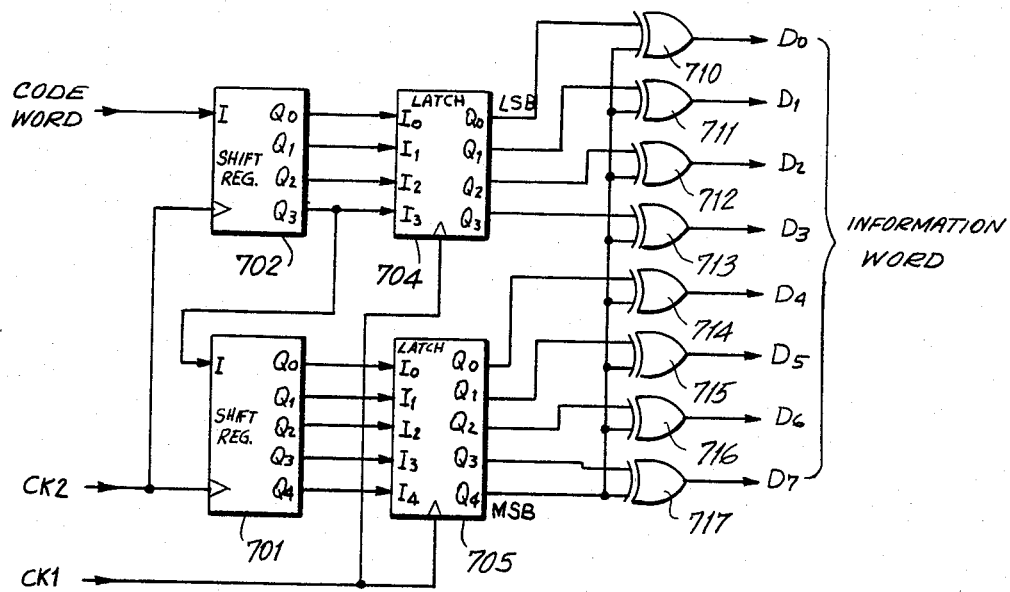
FIG. 16 is a logic diagram of one embodiment of a decoder which can be used with the encoder shown in FIG. 14.

FIG. 16 illustrates one embodiment of a decoder which is adapted to decode the 9-bit code word produced by the encoding circuitry of FIG. 14. This decoder is similar to the decoder described above with respect to FIG. 6, except that it is capable of receiving nine bits rather than five bits, and to decode those nine bits into an 8-bit signal, rather than a 4-bit signal. The decoder of FIG. 16 is comprised of a serial-parallel shift register formed of stages 701 and 702 which function to receive the serially-transmitted bits of the 9-bit code word and to temporarily store such bits in parallel form. These parallel bits then are loaded into a latch circuit comprised of stages 704 and 705, from which the eight least significant bits are supplied to respective inputs of exclusive-OR circuits 710–717, and the most significant bit is supplied, in common, to the remaining input of each of these exclusive-OR circuits. If the most significant bit of the received 9-bit code word is a binary "0", exclusive-OR circuits 710–717 pass the remaining eight bits as is, so as to recover the original information word. However, if the most significant bit of the received code word is a binary "1", then the exclusive-OR circuits invert each of the remaining eight bits so as to recover the original information word. The decoder illustrated in FIG. 16 thus functions in a manner which is compatible with the table illustrated in FIG. 15. In view of the similarities of the decoder shown in FIG. 16 and the decoder shown in FIG. 6, further description is not necessary.

Figure 17:
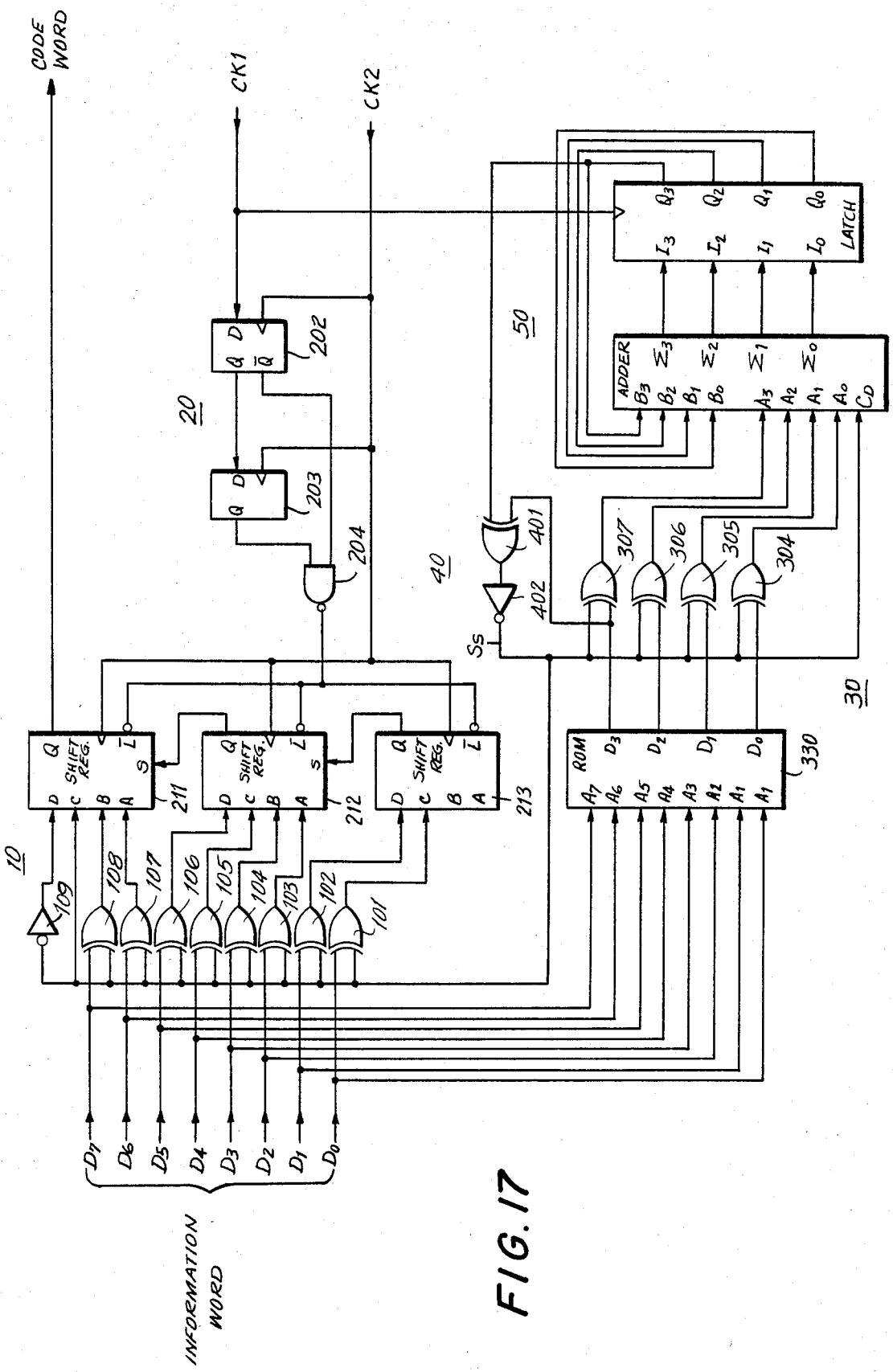
FIG. 17 is a logic diagram of a still further embodiment of the present invention.

Yet another embodiment of the present invention is illustrated in FIG. 17, wherein an 8-bit information word is encoded into a 10-bit (m=10) code word. This encoder is similar to the encoder shown in FIG. 14, except that the code word now is provided with two redundant bits. These two redundant bits are complements of each other, that is, one is a binary "1" and the other is a binary "0". Since the code word now is provided with an even number of bits, several CODE+ and CODE− words may exhibit zero disparity, that is, such code words may be comprised of an equal number of binary "1"s and "0"s. One advantage of providing code words with zero disparity is that the DSV may be restrained within close limits.

In FIG. 17, the parallel-input/serial-output shift register is comprised of stages 211, 212 and 213, each being formed of a 4-bit shift register. The four most significant bits of the 10-bit code word are loaded into stage 211, the next four bits of lesser significance are loaded into stage 212, and the two bits of least significance are loaded into stage 213. These bits are serially shifted from stage 213 through stages 212 and 211, to emerge from the Q output of stage 211. The remaining circuitry of parallel-to-serial converter 20, as well as disparity calculating circuit 30, selection signal generating circuit 40 and DSV determining circuit 50 are the same as discussed above with respect to the embodiment shown in FIG. 14.

It is recognized that, since the code word which is generated by the embodiment shown in FIG. 17 is comprised of an even number of bits, the disparity of each code word likewise is an even number. Hence, the least significant bit of the digital representation of the disparity always is a binary "0".

FIG. 18 illustrates a table representing the respective CODE+ and CODE− words which may represent each input information word, together with the corresponding disparity of such code words. Selection signal $S_s$ is determined in the same way as in the embodiment of FIG. 14. That is, if the sign bit of the current DSV is equal to the sign bit of the disparity which is calculated for the CODE+ word corresponding to the input information word, then the selection signal $S_s$ is a binary "1". If these sign bits differ from each other, then the selection signal $S_s$ is a binary "0". When this selection signal is a binary "0", the eight least significant bits of the code word are equal to the input information word. However, if the selection signal $S_s$ is a binary "1", then these eight bits are inverted versions of the information word. Furthermore, the two most significant bits of the CODE+ word are [10] when the selection signal is a binary "0", and these two most significant bits are [01] when the selection signal is a binary "1".

It may be appreciated that the embodiments of FIGS. 14 and 17 are substantially similar to each other and, if it is assumed that, in both embodiments, the code word includes l most significant bits (wherein l=1 or 2), then the operation of the embodiment of FIG. 17 is substantially identical to the operation of the embodiment of FIG. 14. Thus, if the current DSV is of positive magnitude, represented by a binary "0" sign bit, then the code word which is selected to represent the input information word exhibits negative disparity. Conversely, if the DSV is of negative magnitude, then the code word which is selected to represent the input information word exhibits positive disparity. Thus, the embodiment shown in FIG. 17 implements the table shown in FIG. 18; and, in the interest of brevity, further description is not provided.

Figure 19:
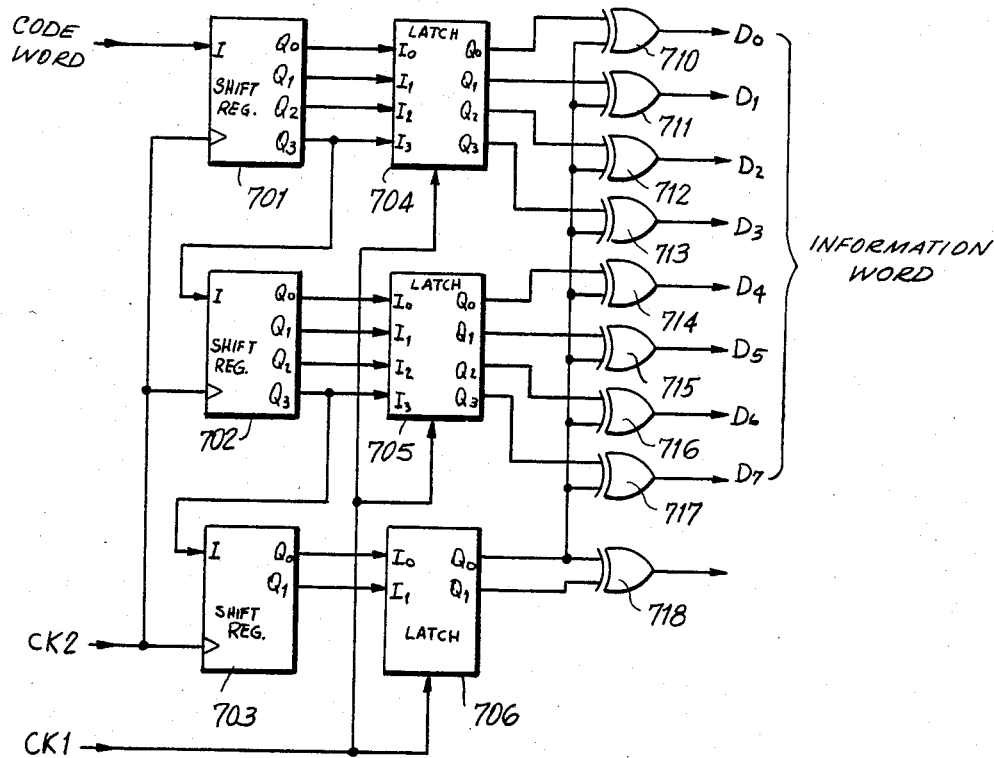
FIG. 19 is a logic diagram of a decoder which can be used with the encoder shown in FIG. 17.

One embodiment of a decoder which is compatible with the encoding circuitry illustrated in FIG. 17 is shown in FIG. 19. It is appreciated that this decoder is similar to the decoder described above with respect to FIG. 16. This decoder includes a serial/parallel shift register comprised of stages 701, 702 and 703, adapted to receive the serially transmitted bits of the 10-bit code word and, when the shift register is loaded, to transfer these ten bits in parallel form to a latch circuit comprised of stages 704, 705 and 706. Each stage of the shift register is a four-stage register of the type which is commercially available. As shown, the output terminal $Q_3$ corresponding to the most significant bit of stage 701 is coupled to the input terminal I of stage 702, and the output terminal $Q_3$ of this stage is coupled to the input terminal of the next-following stage 703. Thus, the most significant bit of the 10-bit code word is serially transmitted through stages 701 and 702 to stage 703.

Each stage of the latch circuit is comprised of a 4-bit latch device whose input terminals are coupled to the output terminals of a corresponding stage of the shift register, and whose output terminals are coupled to respective inputs of exclusive-OR circuits 710–718. It is appreciated that the eight bits which are stored in stages 704 and 705 of the latch circuit are used to recover the original input information word. The two most significant bits of the code word are stored in stage 706 of the latch circuit. From the table illustrated in FIG. 18, it is seen that, if a CODE+ word is received, the bit provided at output terminal $Q_0$ of stage 706 is a binary "0", and the bit provided at output terminal $Q_1$ is a binary "1". Conversely, if a CODE− word is received, the bit provided at output terminal $Q_0$ of stage 706 is a binary "1", and the bit provided at output terminal $Q_1$ is a binary "0". Accordingly, the bit provided at output terminal $Q_0$ may be used to control the operation of exclusive-OR circuits 710–717 to selectively pass the eight least significant bits of the received code word, as is, to recover the original information word; or to invert these eight bits to recover the information word. When the CODE+ word is received, exclusive-OR circuits 710–717 pass the eight least significant bits of the code word, as is. When a CODE− word is received, exclusive-OR circuits 710 ∝ 717 invert these eight bits.

From the foregoing discussion, and from FIG. 18, it is seen that, in the 10-bit decoder, the two most significant bits must differ from each other. If these bits are the same, the received code word is erroneous. Accordingly, an additional exclusive-OR circuit 718 is provided to compare these two code bits and functions as an error detector. If these code bits differ from each other, exclusive-OR circuit 718 produces a binary "1" representing accurate reception. However, if these code bits are equal to each other, exclusive-OR circuit 718 produces a binary "0" to indicate the presence of an error in the received code word. This error indication may be used to inhibit the recovered information word from being processed further.

In the foregoing embodiments, the n-bit information word is converted to an m-bit code word by adding l most significant bits to the information word and selectively passing or inverting the information word bits, depending upon the state of the added l bits. It is contemplated, however, that these l bits may be added at any location to the information word. For example, these l bits may be added as the least significant bits or may be added to any desired predetermined locations in the information word. Nevertheless, it is appreciated that each information word may be represented by one or another code word; whereas each code word is representative of one and only one information word. Furthermore, the particular code word which is selected to represent the input information word exhibits a disparity whose polarity is opposite to the current DSV.

For those applications of the present invention wherein the m-bit code word is comprised of an even number of bits, it is appreciated that, if desired, some information words may be represented by only one code word, that code word having zero disparity, while the remaining information words may be represented by two code words, one of positive disparity and the other of negative disparity. Also, some information words may be represented by a code word of zero disparity and a code word of positive disparity, other information words may be represented by code words of zero disparity and code words of negative disparity, and still other information words may be represented by code words of positive and negative disparity. This increases the flexibility in selecting an appropriate code word to represent an input information word, depending upon the current DSV.

In some of the foregoing embodiments, a CODE+ word preliminarily is produced in response to an input information word. This preliminary code word is selected if its disparity is of opposite polarity to the current DSV. However, if the disparity of the preliminary code word is the same as the polarity of the DSV, then the CODE− word which represents the input information word is selected.

A summary of the selection of a particular code word to represent an input information word as a function of the current DSV is set out in the following table. In this table, it is assumed that five different types of representation are available: I. Each information word is represented by a code word having zero disparity; II. each information word is represented by a code word having zero disparity and by another code word having positive disparity; III. each information word is represented by a code word having zero disparity and by another code word having negative disparity; IV. each information word is represented by a code word having positive disparity and by another code word having negative disparity; and V. each information word is represented by a code word having positive disparity, by another code word having zero disparity and by yet another code word having negative disparity. An "X" indicates which of these code words is selected if the current DSV is positive, or if the current DSV is negative, or if the current DSV is equal to zero.

TABLE

| | Disparity of Code Words | +DSV | −DSV | 0 DSV |
|---|---|---|---|---|
| I | zero | X | X | X |
| II | zero | X | | X |
| | + | | X | |
| III | zero | | X | X |
| | − | X | | |
| IV | + | | X | X |
| | − | X | | X |
| V | + | | X | |
| | zero | | | X |
| | − | X | | |

Figure 20:
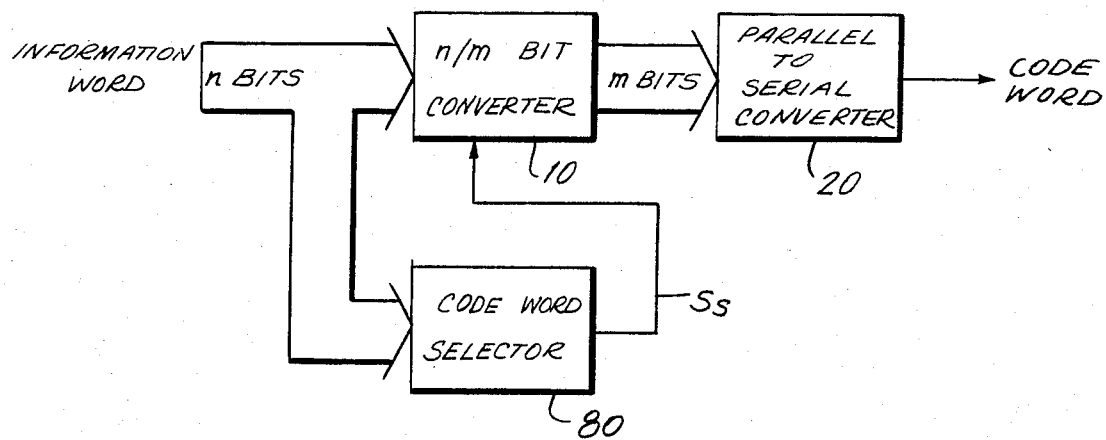
FIGS. 20, 21 and 22 are block diagrams which represent the different embodiments of the present invention.
Figure 21:
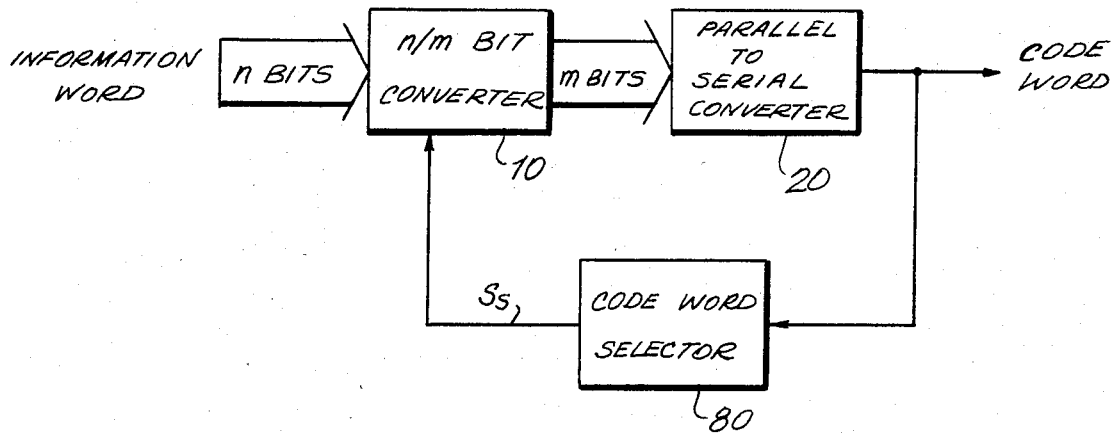
Figure 22:
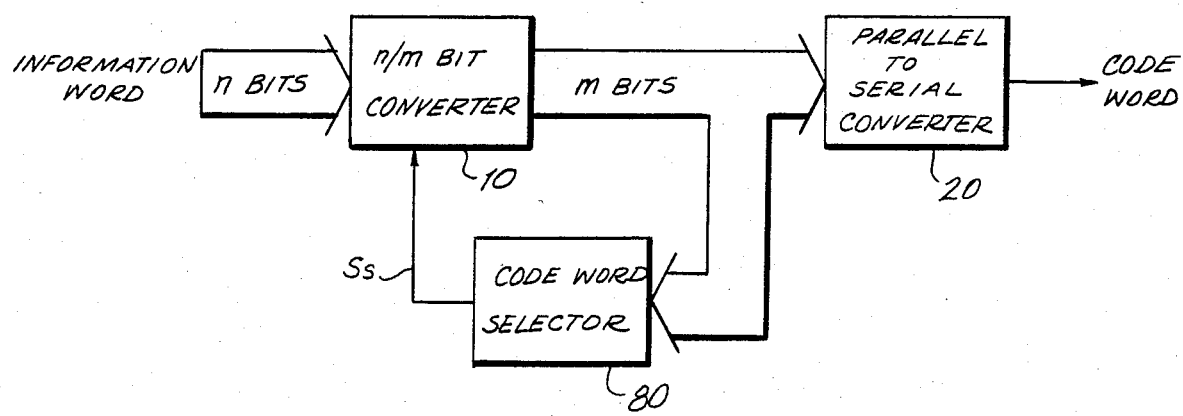

FIGS. 20, 21, and 22 are block diagrams which represent various embodiments of the present invention, each embodiment including an n/m-bit converter 10, a parallel-to-serial converter 20 and a code-word selector 80. In each embodiment, an n-bit information word is supplied, in parallel, to converter 10. The converter serves to convert each N-bit information word into a corresponding bit code word, the m-bit code word being supplied, in parallel, to parallel-to-serial converter 20. This converter serves to serialize the m-bit code word. Furthermore, each code-word selector 80 functions to produce selection signal $S_s$, the logic condition of this selection signal being used to select either the CODE+ or the CODE− word as the m-bit code word. In FIG. 20, the n-bit information word is supplied to code-word selector 80 from which the selection signal is produced. Hence, in FIG. 20, code-word selector 80 may comprise the disparity calculating circuit 30, the selection signal generating circuit 40 and the DSV determining circuit 50 shown in, for example, FIGS. 4, 7, 11, 12, 14 and 17.

In FIG. 21, code-word selector 80 is coupled to the output of parallel-to-serial converter 20 to produce the selection signal $S_s$ as a function of the serially-transmitted code words. Hence, code-word selector 80 may comprise the DSV determining circuit 50 shown in FIG. 13.

In the embodiment of FIG. 22, code-word selector 80 is supplied with the m-bit code word produced by converter 10, and is responsive to this code word to generate selection signal $S_s$. The code-word selector may comprise the disparity calculating circuit 30 and the DSV determining circuit 50 of FIG. 11 if, for example, the code word supplied to shift register 201 also is supplied to the disparity calculating circuit in place of the input information word. Furthermore, obvious modifications to the disparity calculating circuit should be made.

In the embodiments of FIGS. 20–22, gating circuits 60, such as shown in the embodiment of FIG. 7, may be provided to limit undesired run-lengths of binary "0"s and "1"s in the event that the current DSV is equal to a predetermined value, such as zero. Also, in the foregoing description, it has been assumed that disparity is equal to the number of binary "1"s in the code word minus the number of binary "0"s in that word. If desired, disparity may be calculated as a function of the number of binary "0"s minus the number of binary "1"s in the code word.

While the present invention has been particularly shown and described with reference to certain preferred embodiments, it should be readily apparent that various modifications in form and details may be made without departing from the spirit and scope of the invention. Some of these modifications have been discussed above.

What is claimed is:

1. A method of passing information encoded in successive binary word signals through a system employing a transferring means for transferring said information, wherein said transferring means is of the type which suppresses a DC component of a transferred signal, said method minimizing both said DC component and redundancy in said binary word signals, said method comprising the steps of:
receiving said information as a present information word signal in a form having n two-level bits, $n \geq 2$;
selectively generating a selected one of a plurality of binary code word signals formed of m two-level bits in response to said present n-bit information word signal and utilizing a preceding digital sum variation calculated from a plurality of preceding m-bit code word signals selectively generated from previously received n-bit informatoin words, $m > n$;
calculating a present digital sum variation from said preceding digital sum variation of said plurality of preceding m-bit code word signals in combination with said selected one of said m-bit code signals;
said selected one of said m-bit code signals being selectively generated such that said present digital sum variation, calculated as a function of said selected one of said m-bit code word signals is reduced in value; and
transferring said selected one of said m-bit code word signals by means of said transferring means.

2. The method of claim 1 wherein said step of calculating the present digital sum variation comprises determining the disparity of said generated m-bit code word signal; and summing the determined disparity with the digital sum variation of said plurality of preceding m-bit code word signals.

3. The method of claim 2 wherein said step of determining the disparity of said generated m-bit code word comprises counting the number of bits of a predetermined logic state included in said n-bit information word to be encoded; doubling the counted number; and subtracting m from said counted number to produce a digital representation of disparity.

4. The method of claim 3 wherein said step of determining the disparity of said generated n-bit word further comprises inverting all but the least significant bit of said digital representation of disparity if the most significant bit in said generated m-bit code word is of a preselected logic state.

5. The method of claim 2 wherein said step of determining the disparity of said generated m-bit word comprises producing respective digital representations of disparity for corresponding sets of n-bit information words; and detecting the particular set which includes said n-bit information word to be encoded so as to produce the corresponding, respective digital representation of disparity.

6. The method of claim 2 wherein said step of determining the disparity of said generated m-bit word comprises producing a digital representation of disparity whose most significant bit is opposite to the most significant bit of the digital representation of the digital sum variation of said plurality of preceding m-bit code words, and whose lesser significant bits are determined by detecting if said n-bit information word to be encoded is equal to one of preselected n-bit words and, if so, producing particular lesser significant bits as a function of the detected n-bit information word.

7. The method of claim 2 wherein said step of determining the disparity of said generated m-bit code word comprises storing a digital representation of the disparity of each m-bit code word that can be generated; and using said next-following n-bit information word and said digital sum variation to read out the particular stored digital representation associated with said generated m-bit code word.

8. The method of claim 2 wherein said step of determining the disparity of said generated m-bit code word signal comprises storing a digital representation of the absolute magnitude of the disparity of each m-bit code word signal that can be generated to represent respective ones of said n-bit information word signals; using the received present n-bit information word signal to read out the stored digital representation of the absolute magnitude of said disparity; and selectively inverting said read out digital representation if the most significant bit in said generated m-bit code word signal is of a preselected logic state.

9. The method of claim 1 wherein said step of calculating the digital sum variation comprises counting in a first direction each binary "1" included in each generated m-bit code word; and counting in a second, opposite direction each binary "0" included in each said generated m-bit code word, the count being equal to a digital representation of said digital sum variation.

10. The method of claim 9 wherein said step of utilizing said calculated digital sum variation to selectively generate one of a plurality of m-bit code words comprises using the most significant bit of said digital sum variation as a preselected bit of said m-bit code word; using the next-following n-bit information word as the remaining bits of said m-bit code word; and inverting said remaining bits if said most significant bit of said count is of a preselected logic state.

11. The method of claim 1, further comprising the steps of detecting if a predetermined number of the bits in said next-following n-bit information word are of a preselected logic state and, if so, inverting the logic state of said most significant bit of said count.

12. The method of claim 2 wherein said step of utilizing said calculated preceding digital sum variation to selectively generate one of a plurality of m-bit code word signals comprises comparing the most significant bit of said preceding digital sum variation to the most significant bit of said disparity; providing said m-bit code word signal with a most significant bit having a first logic state and with remaining bits equal to the bit of said present n-bit information word signal if the most significant bits of said preceding digital sum variation and said disparity differ from each other; and providing said m-bit code word signal with a most significant bit having a second logic state and with remaining bits equal to inverted versions of the bits of said present n-bit information word signal if the most significant bits of said preceding digital sum variation and said disparity are equal to each other.

13. The method of claim 12 further comprising the step of storing the most significant bit of the disparity of the immediately preceding m-bit code word; detecting when said digital sum variation is equal to a predetermined value; generating a preliminary m-bit code word to represent the next-following n-bit information word; comparing the most significant bit of the disparity of said preliminary m-bit code word to said stored most significant bit when said digital sum variation is equal to said predetermined value; utilizing said preliminary m-bit code word if the most significant bit of said disparity of said preliminary m-bit code word differs from said stored most significant bit; and inverting all of the bits of said preliminary m-bit code word if the most significant bit of said disparity of said preliminary m-bit code word is equal to said stored most significant bit.

14. The method of claim 1 wherein said step of utilizing said calculated digital sum variation to selectively generate one of a plurality of m-bit code words comprises storing $2^m$ m-bit code words; using said next-following n-bit information word together with the most significant bit of said digital sum variation as an address word; and reading out the m-bit code word addressed by said address word.

15. The method of claim 1 wherein $n=4$ and $m=5$.

16. The method of claim 1 wherein $n=8$ and $m=9$.

17. The method of claim 1 wherein $n=8$ and $m=10$.

18. A method of passing information encoded in successive binary word signals through a system employing a transferring means for transferring said information, wherein said transferring means is of the type which suppresses a DC component of a transferred signal, said method minimizing both said DC component and redundancy in said code word signals, said method comprising the steps of receiving an information word signal having n two-level bits, $n \geq 2$; selectively generating one of at least two code word signals, each formed of m two-level bits with $m > n$, to represent the received n-bit information word signal, the m-bit code word signals representing a particular n-bit information word signal having disparities of equal absolute magnitude but opposite polarities; calculating the current digital sum variation based upon successive ones of m-bit code word signals which have been generated, including the immediately preceding m-bit code word signal; and selecting the one m-bit code word signal whose disparity, when combined with the current digtal sum variation, reduces the digital sum variation towards zero and transferring said one m-bit code word signal by means of said transferring means.

19. The method of claim 18 wherein the disparity of each generated m-bit code word signal is represented as a digital signal, including a sign bit indicating the polarity of said disparity; wherein the current digital sum variation is represented as a digital signal, including a sign bit indicating the polarity of said digital sum variation; and wherein said step of selecting comprises selecting the one m-bit code word signal whose disparity sign bit is opposite to the sign bit of said current digital sum variation.

20. The method of claim 19 further comprising the steps of detecting when said current digital sum variation is equal to zero; and wherein the step of selecting comprises selecting the one m-bit code word whose disparity sign bit is opposite to the disparity sign bit of the immediately preceding m-bit code word when said current digital sum variation is equal to zero.

21. The method of claim 18 wherein said step of selecting comprises selecting the one m-bit code word signal whose disparity is of a polarity opposite to the polarity of said current digital sum variation.

22. The method of claim 18 wherein said step of selectively generating comprises generating a first m-bit code word signal whose l most significant bits are of first preselected logic states and whose remaining bits are constituted by said received n-bit information word signal; and generating a second m-bit code word signal whose l most significant bits are of second preselected logic states and whose remaining bits are constituted by the complement of said received n-bit information word signal.

23. The method of claim 22, wherein $l=1$.

24. The method of claim 22, wherein $l=2$; and wherein one of said preselected logic states is constituted by [10] and the other of said preselected logic states is constituted by [01].

25. Apparatus for passing information encoded in successive binary word signals through a system employing a transferring means for transferring said information, wherein said transferring means is of the type which suppresses a DC component of a transferred word, said apparatus minimizing both said DC component and redundancy in said transferred words, said apparatus encoding said successive information words, each having n two-level bits, into corresponding code words, each formed of m two-level bits, wherein $n \geq 2$ and $m > n$, said apparatus comprising: DSV determining means for determining the current digital sum variation (DSV) of a plurality of preceding code words; receiving means for receiving an n-bit information word to be encoded; encoding means for selectively encoding the received n-bit information word into one of at least two code words, both of said at least two code words being representative of said received information word and having disparities of equal absolute magnitude and opposite polarities, and both being formed of m two-level bits; selection means for selecting the one m-bit code word having the disparity which, when combined with said current digital sum variation reduces said digital sum variation toward zero, and transferring means for transferring said one m-bit code word.

26. The apparatus of claim 25 further comprising disparity calculating means for calculating the disparity of the selected m-bit code word which represents said received n-bit information word.

27. The apparatus of claim 26 wherein said DSV determining means comprises summing means for summing a digital representation of the calculated disparity and a digital representation of the current DSV to produce an updated digital representation of the DSV based upon said plurality of preceding code words and said selected code word.

28. The apparatus of claim 27 wherein said selection means comprises means for preliminarily selecting one of said at least two code words; and comparison means for comparing the disparity of the preliminarily selected code word to the current DSV to determine if the current DSV will decrease if said disparity of said preliminarily selected code word is summed therewith and, if not, to change the preliminary selection to another of said at least two code words.

29. The apparatus of claim 28 wherein the digital representations of the calculated disparity and of the current DSV respectively represent positive or negative values, the most significant bits thereof being indicative of polarity; and wherein said comparison means is coupled to receive and compare the respective most significant bits of the digital representations of said disparity and said DSV so as to change the preliminary selection of the code word if the compared most significant bits are equal.

30. The apparatus of claim 29 wherein said comparison means is an exclusive-OR circuit.

31. The apparatus of claim 29 further comprising detecting means for detecting when said current DSV is equal to a predetermined value; storage means for storing the most significant bit of the digital representation of the disparity of the immediately preceding code word; and gating means operative when said current DSV is equal to said predetermined value to supply said stored most significant bit to said comparison means, whereat said stored most significant bit is compared to the most significant bit of the digital representation of said disparity of said preliminarily selected code word, said gating means being operative when said current DSV is not equal to said predetermined value to supply the most significant bit of the digital representation of said current DSV to said comparison means.

32. The apparatus of claim 25 wherein the digital representation of current DSV represents a positive or negative value, the most significant bit thereof being indicative of polarity; and wherein said selection means comprises means for receiving said most significant bit to select a predetermined one of said at least two m-bit words when said most significant bit is of a first logic state, and to select another of said at least two m-bit words when said most significant bit is of a second logic state.

33. The apparatus of claim 32 wherein said encoding means comprises gate means for receiving the n-bit information word to be encoded and for receiving said most significant bit of said digital representation of said current DSV for passing the n-bit information word, as is, if said most significant bit is of said first logic state and for inverting the respective bits of said n-bit information word if said most significant bit is of said second logic state; and means for using said most significant bit as an (n+1)th bit, whereby m=n+1.

34. The apparatus of claim 33, wherein said receiving means supplies said gate means with said n-bit information word as a parallel-bit word; and wherein said gate means comprises n exclusive-OR circuits.

35. The apparatus of claim 34 wherein said encoding means further comprises parallel-to-serial conversion means coupled to receive the outputs of said n exclusive-OR circuits and said most significant bit for serializing said (n+1) bits.

36. The apparatus of claim 35 wherein said most significant bit also is the most significant bit of said serialized (n+1) bits.

37. The apparatus of claim 36 wherein said encoding means further comprises sensing means for sensing when at least a predetermined number of bits in said n-bit information word all exhibit a particular logic state to invert the most significant bit supplied to said gate means and to said parallel-to-serial conversion means.

38. The apparatus of claim 32 wherein said encoding means comprises memory means having a plurality of addressable storage locations for storing respective ones of said m-bit code words and having n+1 address bit input terminals coupled to receive said n-bit information word and said most significant bit of the digital representation of said current DSV, whereby the m-bit code word stored in the location then being addressed by said n-bit information word and said most significant bit is read out.

39. The apparatus of claim 25 further comprising disparity calculating means for calculating the disparity of a selected one of said at least two m-bit code words which are representative of said received information word; and wherein said selection means comprises means for comparing a representation of said calculated disparity to a representation of said current DSV to determine if said current DSV would be reduced if said one m-bit code word is selected and to produce a selection signal indicative thereof; and said encoding means comprises gate means for receiving the n-bit information word to be encoded and for receiving said selection signal for passing the n-bit information word, as is, if said selection signal is of a first value and for inverting the respective bits of said n-bit information word if said selection signal is of a second value, and means for using said selection signal and said n-bit information word, in combination, as said m-bit code word.

40. The apparatus of claim 39 wherein m=(n+1); and wherein said selection signal comprises the most significant bit of said m-bit code word.

41. The apparatus of claim 39 wherein m=(n+2); and wherein said selection signal and an inverted version thereof comprise the two most significant bits of said m-bit code word.

42. The apparatus of claim 39 wherein said encoding means further comprises parallel-to-serial conversion means coupled to receive and serialize said m-bit code word.

43. The apparatus of claim 25 wherein said DSV determining means comprises disparity calculating means for calculating the disparity of the selected m-bit code word which represents said received n-bit information word; means for selectively modifying the calculated disparity as a function of the selected m-bit code word; and summing means for summing the selectively modified disparity and said current DSV to produce an updated DSV.

44. The apparatus of claim 43 wherein said disparity calculating means comprises means for determining the number of bits in said received information word which exhibit a predetermined logic state; and means for doubling said determined number and subtracting m therefrom to produce a digital representation of the disparity of said selected m-bit code word.

45. The apparatus of claim 44 wherein said current DSV is represented by a digital signal having a bit indicative of polarity and wherein said digital representation of the disparity of said selected m-bit code word has a bit indicative of polarity; and wherein said means for selectively modifying the calculated disparity comprises comparison means for comparing the bits indicative of polarity of the respective digital representations of disparity and DSV; and means for inverting all but the least significant bit of said digital representation of disparity if the compared bits are equal.

46. The apparatus of claim 43 wherein said disparity calculating means comprises plural sets of gate means, each set being supplied with selected ones of the bits of said n-bit information word, and each gate means in a respective set being operative to detect if a corresponding n-bit information word has been received; and plural output means associated with particular ones of said plural gate means to produce corresponding output signals when selected n-bit information words are received; thereby producing a digital representation of the disparity of said selected m-bit code word, said digital representation being comprised of the output signals produced by said plural output means.

47. The apparatus of claim 46 wherein said plural output means produce corresponding output signals which comprise the intermediate bits of said digital representation of the disparity of said selected m-bit code word; and wherein said current DSV is represented by a digital signal; ahd said disparity calculating means further comprises inverting means for inverting the most significant bit of the digital signal representing said current DSV to produce the most significant bit of said disparity.

48. The apparatus of claim 43 wherein said disparity calculating means comprises addressable memory means having an addressable location for each m-bit code word whereat a digital representation of the disparity of the corresponding m-bit code word is stored; and means for reading out said digital representation in accordance with the selected m-bit code word.

49. Apparatus for decoding a received m-bit code word to recover an n-bit information word, wherein $n \geq 2$ and $m > n$, comprising n gating means each connected to receive a respective one of n of said m bits of the received code word and to receive a predetermined additional one of said m bits to pass said n bits, as is, if said additional bit is of a first logic state and to invert each of said n bits if said additional bit is of a second logic state.

50. The apparatus of claim 49, further comprising serial-to-parallel converting means for receiving said m-bit code word serially by bit and for converting same to a parallel m-bit code word supplied to said n gating means.

51. An apparatus for passing information encoded in successive binary word signals through a system employing a transferring means for transferring said information, wherein said transferring means is of the type which suppresses a DC component of a transferred signal, said apparatus minimizing both said DC component and redundancy in said code word signals, said apparatus comprising: receiving means for receiving said information as a present information word signal in a form having n two-level bits, $n \geq 2$; means for selectively generating a selected one of a plurality of binary code word signals formed of m two-level bits in response to said present n-bit information word signal and utilizing a preceding digital sum variation calculated from a plurality of preceding m-bit code words selectively generated from previously received n-bit information words, $m > n$; means for calculating a present digital sum variation from said preceding digital sum variation of said plurality of preceding m-bit code word signals in combination with said selected one of said m-bit code signals; said selected one of said m-bit code signals being selectively generated such that said present digital sum variation, calculated as a function of said selected one of said m-bit code word signals, is reduced in value; and transferring means for transferring said selected one of said m-bit code word signals.

* * * * *